United States Patent
Yamamoto et al.

(10) Patent No.: US 8,689,927 B2
(45) Date of Patent: Apr. 8, 2014

(54) ELECTRIC POWER STEERING DEVICE

(75) Inventors: Yasuharu Yamamoto, Toyota (JP); Yuki Bando, Nara (JP)

(73) Assignee: JTEKT Corporation, Osaka (JP)

( * ) Notice: Subject to any disclaimer, the term of this patent is extended or adjusted under 35 U.S.C. 154(b) by 164 days.

(21) Appl. No.: 13/355,986

(22) Filed: Jan. 23, 2012

(65) Prior Publication Data
US 2012/0186896 A1    Jul. 26, 2012

(30) Foreign Application Priority Data

Jan. 21, 2011 (JP) ................. 2011-010788
Apr. 19, 2011 (JP) ................. 2011-093154

(51) Int. Cl.
    *B62D 5/04* (2006.01)
(52) U.S. Cl.
    USPC .......................... 180/444; 180/443
(58) Field of Classification Search
    USPC .......................... 180/443, 444, 446
    See application file for complete search history.

(56) References Cited

U.S. PATENT DOCUMENTS

| | | | |
|---|---|---|---|
| 7,025,169 B2 * | 4/2006 | Tatewaki et al. | 180/444 |
| 8,307,940 B2 * | 11/2012 | Bugosh et al. | 180/444 |
| 2004/0099472 A1 * | 5/2004 | Johnson et al. | 180/444 |
| 2005/0205342 A1 | 9/2005 | Tatewaki et al. | |
| 2011/0127742 A1 * | 6/2011 | Bae et al. | 280/93.513 |

FOREIGN PATENT DOCUMENTS

| | | |
|---|---|---|
| DE | 10 2004 034 701 A1 | 2/2006 |
| DE | 10 2006 037 479 A1 | 2/2008 |
| DE | 10 2008 041 872 A1 | 3/2010 |
| EP | 2 049 383 B1 | 12/2009 |
| JP | A-2005-221024 | 8/2005 |
| JP | A-2005-343308 | 12/2005 |
| JP | A-2005-343434 | 12/2005 |
| JP | A-2005-349861 | 12/2005 |

OTHER PUBLICATIONS

May 3, 2012 Search Report issued in European Patent Application No. 12151822.9.

* cited by examiner

*Primary Examiner* — Kevin Hurley
*Assistant Examiner* — Marc A Scharich
(74) *Attorney, Agent, or Firm* — Oliff PLC

(57) ABSTRACT

An electric power steering device includes a metallic housing, a steered shaft, an electric motor, a ball screw device, a rolling bearing, elastic members, and a plain bearing. The plain bearing is provided between the housing and an outer ring of the rolling bearing, and formed from a resin material.

21 Claims, 12 Drawing Sheets

ELECTRIC POWER STEERING DEVICE

INCORPORATION BY REFERENCE

The disclosure of Japanese Patent Application No. 2011-010788 filed on Jan. 21, 2011 and Japanese Patent Application No. 2011-093154 filed on Apr. 19, 2011, including the specifications, drawings and abstracts is incorporated herein by reference in its entirety.

BACKGROUND OF THE INVENTION

1. Field of the Invention

The present invention relates to an electric power steering device that includes a steered shaft that is provided in a metallic housing so as to be capable of reciprocating motion, an electric motor that is attached to the housing, a ball screw device that converts rotation of the electric motor into rectilinear motion of the steered shaft, and a rolling bearing that rotatably supports the ball screw device on the housing.

2. Description of Related Art

Japanese Patent Application Publication No. 2005-343308 (JP-A-2005-343308), for example, discloses an example of the ball screw device described above.

There also has been proposed an electric power steering device in which a steering assist force that is generated by driving an electric motor is added via a belt to a steering force that is generated by operating a steering wheel to perform steering (see Japanese Patent Application Publication No. 2005-343434 (JP-A-2005-343434), for example). In the electric power steering device according to JP-A-2005-343434, the belt is wound around a driving pulley that is provided on a rotary shaft of the electric motor and a driven pulley that is provided on a ball screw nut that is fitted with a threaded portion of a rack shaft via balls. A driving force of the electric motor rotates the ball screw nut via the belt, along with which the rack shaft which includes the threaded portion is driven in the axial direction to assist steering.

SUMMARY OF THE INVENTION

The configuration of a ball screw device 1000 according to a related art will be described with reference to FIG. 8. The ball screw device 1000 includes a ball screw nut 1200 that surrounds a threaded portion 1110 that is formed on a steered shaft 1100, and balls 1300 that are provided between the threaded portion 1110 and the ball screw nut 1200. The ball screw nut 1200 is rotatably supported on a metallic housing 1400 by a rolling bearing 1500 that is attached to the housing 1400. The rolling bearing 1500 is loose-fitted in the housing 1400.

Elastic members 1600 are provided at both end portions of the rolling bearing 1500 in the axial direction of the steered shaft 1100. Therefore, when the steered shaft 1100 is subjected to a force that acts in the axial direction, the force is transmitted to the rolling bearing 1500 via the balls 1300 and the ball screw nut 1200 to move an outer ring 1510 of the rolling bearing 1500 in the axial direction while compressing the elastic members 1600.

When the steered shaft 1100 is subjected to a force that acts in the radial direction of the steered shaft 1100 because the vehicle runs onto a curb, for example, the force in the radial direction inclines the outer ring 1510 of the rolling bearing 1500 with respect to the housing 1400. Due to the inclination of the outer ring 1510, an edge of the outer ring 1510 is pressed against the housing 1400. This increases the pressure of contact of the outer ring 1510 with the housing 1400.

When the steered shaft 1100 is subjected to a force that acts in the axial direction of the steered shaft 1100 with the outer ring 1510 inclined as described above, the outer ring 1510 slides with respect to the housing 1400 with the outer ring 1510 pressed against the housing 1400. Therefore, the rolling bearing 1500 may be stuck in the housing 1400.

In the electric power steering device disclosed in JP-A-2005-343434, an outer ring of a bearing that rotatably supports the ball screw nut is fixed to the housing. Thus, the rack shaft starts moving in the axial direction only after receiving a force in the axial direction that exceeds friction of the ball screw. This deteriorates the steering feeling.

Thus, it is conceivable to adopt the following structure in order to allow the rack shaft to start moving smoothly in the initial stage of assisting. That is, a bearing that is retained by the housing and that supports the ball screw nut is elastically supported in the axial direction so as to be movable in the axial direction in the initial stage of assisting. Specifically, annular elastic members are respectively interposed between a pair of end surfaces of an outer ring of the bearing and a stepped portion of the housing and an end surface of a lock nut that is fixed to the housing that respectively face the end surfaces. In addition, the outer periphery of the outer ring of the bearing and the inner periphery of the housing are loosely fitted with each other to facilitate movement of the bearing in the axial direction. In order to prevent backlash of the loosely fitted bearing in the radial direction, an O-ring is disposed in an accommodation groove in the inner periphery of the housing to elastically contact the outer periphery of the outer ring of the bearing so that the bearing is also elastically supported in the radial direction.

In this case, however, a new problem is expected to occur. That is, when the bearing is inserted into the housing to be fitted after the O-ring is inserted into the accommodation groove in the inner periphery of the housing in the manufacturing process, the O-ring may be caught between the inner periphery of the housing and the outer periphery of the outer ring of the bearing, or may be damaged. Thus, it is conceivable to dispense with the O-ring and to use an integral elastic member. That is, the integral elastic member is integrally formed from a single material to include a cylindrical portion (which serves as an alternative to the O-ring) that is interposed between the outer periphery of the outer ring of the bearing and the inner periphery of the housing, and a pair of annular flanges that extend radially inward from a pair of end portions of the cylindrical portion.

In this case, however, the cylindrical portion of the integral elastic member may be elastically deformed in the radial direction to a large degree. Therefore, there is a large difference in amount of movement of the bearing in the radial direction between a non-assisting period and an assisting period, which results in large variations in tension of the belt. This may increase an operating sound level, or may reduce the durability. In addition, if the center distance between an input pulley and an output pulley becomes excessively short, the belt may become so loose that the belt may skip a tooth on the pulleys.

A first object of the present invention is to provide an electric power steering device that can make it less likely that a rolling bearing is stuck in a housing.

A first aspect of the present invention provides an electric power steering device that includes a metallic housing, a steered shaft, an electric motor, a ball screw device, and a rolling bearing. The electric power steering device further includes elastic members and a plain bearing. The steered shaft is provided in the housing so as to be capable of reciprocating motion. The electric motor is attached to the housing.

The ball screw device converts rotation of the electric motor into rectilinear motion of the steered shaft. The rolling bearing rotatably supports the ball screw device on the housing. The elastic members are provided at both ends of the rolling bearing in an axial direction. The plain bearing is provided between the housing and an outer ring of the rolling bearing. The plain bearing is formed from a resin material.

The electric power steering device according to the aspect of the present invention described above can make it less likely that the rolling bearing is stuck in the housing.

A second object of the present invention is to provide an electric power steering device that offers a good steering feeling, that generates a small operating sound, and that has excellent durability.

A second aspect of the present invention provides an electric power steering device that includes an electric motor that generates a steering assist force, a speed reduction mechanism that decelerates rotation of the electric motor, a steered shaft, a ball screw device that converts rotation output from the speed reduction mechanism into movement of the steered shaft in an axial direction, and a housing that accommodates the ball screw device. The speed reduction mechanism includes a driving pulley that is driven by the electric motor, a driven pulley that is disposed to surround the steered shaft, and a belt that couples the driving pulley and the driven pulley to each other. The ball screw device includes a threaded portion that is formed on a part of the steered shaft, a ball screw nut which is threadably engaged with the threaded portion via balls and to which the driven pulley is coupled so as to be rotatable together with the ball screw nut, a bearing that is retained by a bearing retaining portion of the housing to rotatably support the ball screw nut, a pair of elastic elements that respectively receive a pair of end portions of an outer ring of the bearing to elastically support the outer ring in the axial direction and a radial direction, and an annular radial stopper that is disposed between the pair of elastic elements to be retained on the bearing retaining portion. Each of the elastic elements includes a cylindrical portion that extends along an outer periphery of the outer ring, and an annular flange portion that extends radially inward from an end portion of the cylindrical portion along a corresponding end surface of the outer ring. The radial stopper is interposed between the cylindrical portions of the pair of elastic elements. When the belt exerts its tension to generate an urging force that urges the driven pulley toward the driving pulley during a non-assisting period, the cylindrical portions of the pair of elastic elements are elastically compressed by the urging force so that a gap with a predetermined size is formed between a predetermined portion of an inner periphery of the radial stopper and a predetermined portion of the outer periphery of the outer ring.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
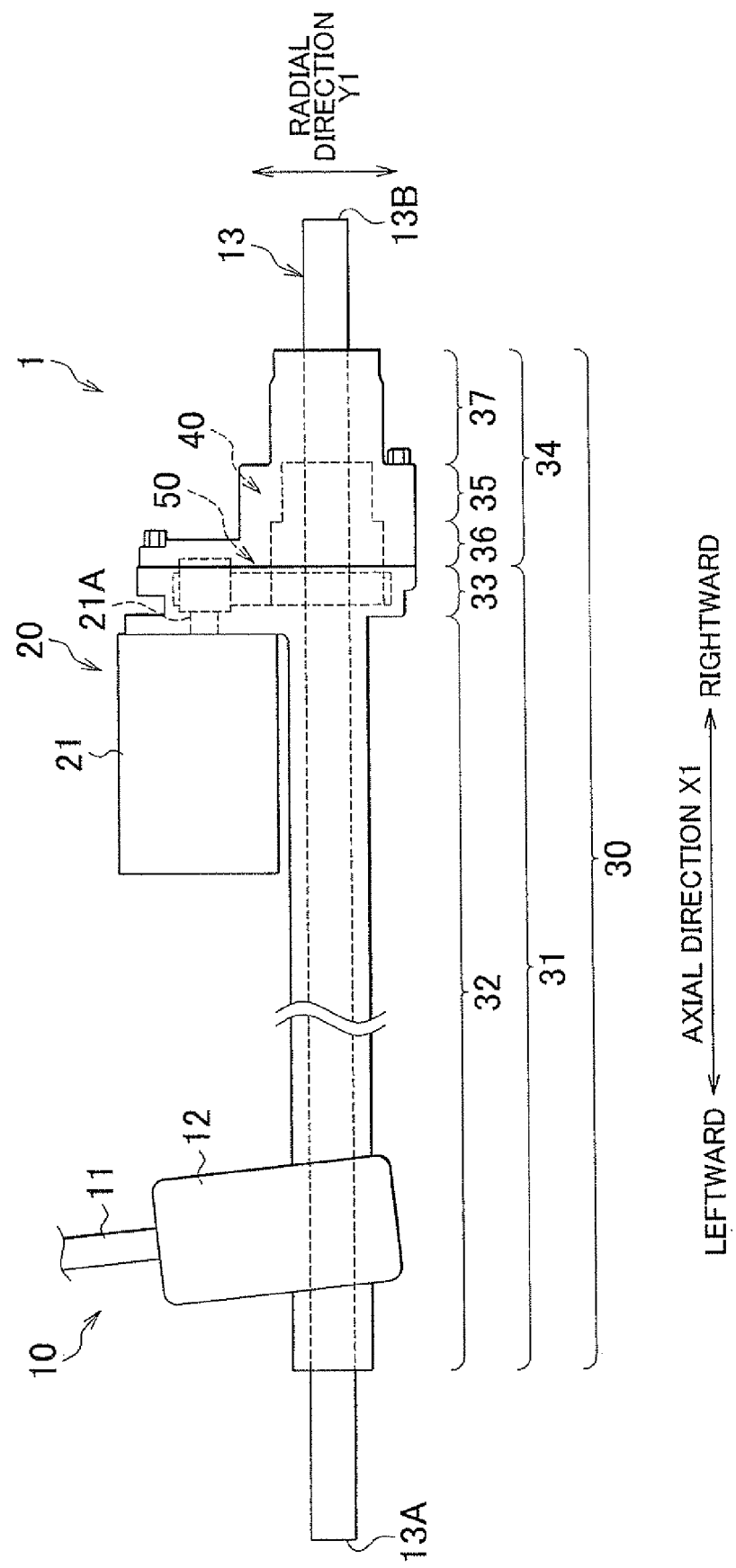
FIG. 1 is a front view that shows the overall configuration of an electric power steering device according to a first embodiment of the present invention.

A first embodiment of the present invention will be described with reference to FIGS. 1 to 6. As shown in FIG. 1, an electric power steering device 1 includes a steering angle transmission mechanism 10, an actuator 20, and a metallic housing 30. The steering angle transmission mechanism 10 transmits rotation of a steering wheel to turning wheels. The actuator 20 applies a force that assists an operation on the steering wheel to a steered shaft 13.

In the following description, the direction from a left end 13A toward a right end 13B of the steered shaft 13 in an axial direction X1 is defined as "rightward", and the direction from the right end 13B toward the left end 13A of the steered shaft 13 in the axial direction. X1 is defined as "leftward".

The steering angle transmission mechanism 10 includes a steering shaft 11, a rack and pinion mechanism 12, and the steered shaft 13. The steering shaft 11 rotates together with the steering wheel. The rack and pinion mechanism 12 converts rotation of the steering shaft 11 into rectilinear motion. The steered shaft 13 moves in the axial direction X1 along with an operation of the rack and pinion mechanism 12.

The actuator 20 includes an electric motor 21 serving as a drive source, a ball screw device 40, a speed reduction mechanism 50, and a support mechanism 60. The ball screw device 40 converts rotation of the electric motor 21 into rectilinear motion of the steered shaft 13 in the axial direction X1. The speed reduction mechanism 50 decelerates rotation of the electric motor 21. The support mechanism 60 rotatably supports the ball screw device 40 on the housing 30.

The housing 30 is formed by a first housing 31 and a second housing 34. An intermediate portion of the steered shaft 13 is accommodated in the housing 30. The left end 13A and the right end 13B of the steered shaft 13 project from the housing 30.

The first housing 31 includes a first cylindrical body portion 32 and a first increased-diameter portion 33. The first increased-diameter portion 33 is larger than the first body portion 32 in a radial direction Y1, and provided at the right end of the first body portion 32. The electric motor 21 is attached to the first increased-diameter portion 33. The electric motor 21 is provided with its output shaft 21A extending in parallel with the steered shaft 13. The rack and pinion mechanism 12 is provided at the left end of the first body portion 32.

The second housing 34 includes a second cylindrical body portion 35, a second increased-diameter portion 36, and a reduced-diameter portion 37. The second increased-diameter portion 36 is larger than the second body portion 35 in the radial direction Y1, and provided at the left of the second body portion 35. The reduced-diameter portion 37 is smaller than the second body portion 35 in the radial direction Y1, and provided at the right of the second body portion 35. The second increased-diameter portion 36 of the second housing 34 is attached to the first increased-diameter portion 33 of the first housing 31.

An operation of the electric power steering device 1 will be described. When a driver rotates the steering wheel, the steering shaft 11 is also rotated together with the steering wheel. Rotation of the steering shaft 11 is converted into rectilinear motion by the rack and pinion mechanism 12. The rack and pinion mechanism 12 transmits a force to the steered shaft 13 to move the steered shaft 13 in the axial direction X1. The steering angle of the turning wheels is changed along with movement of the steered shaft 13 in the axial direction X1. At this time, torque of the output shaft 21A of the electric motor 21 is applied to the steered shaft 13 via the ball screw device 40 as an assisting force.

Figure 2:
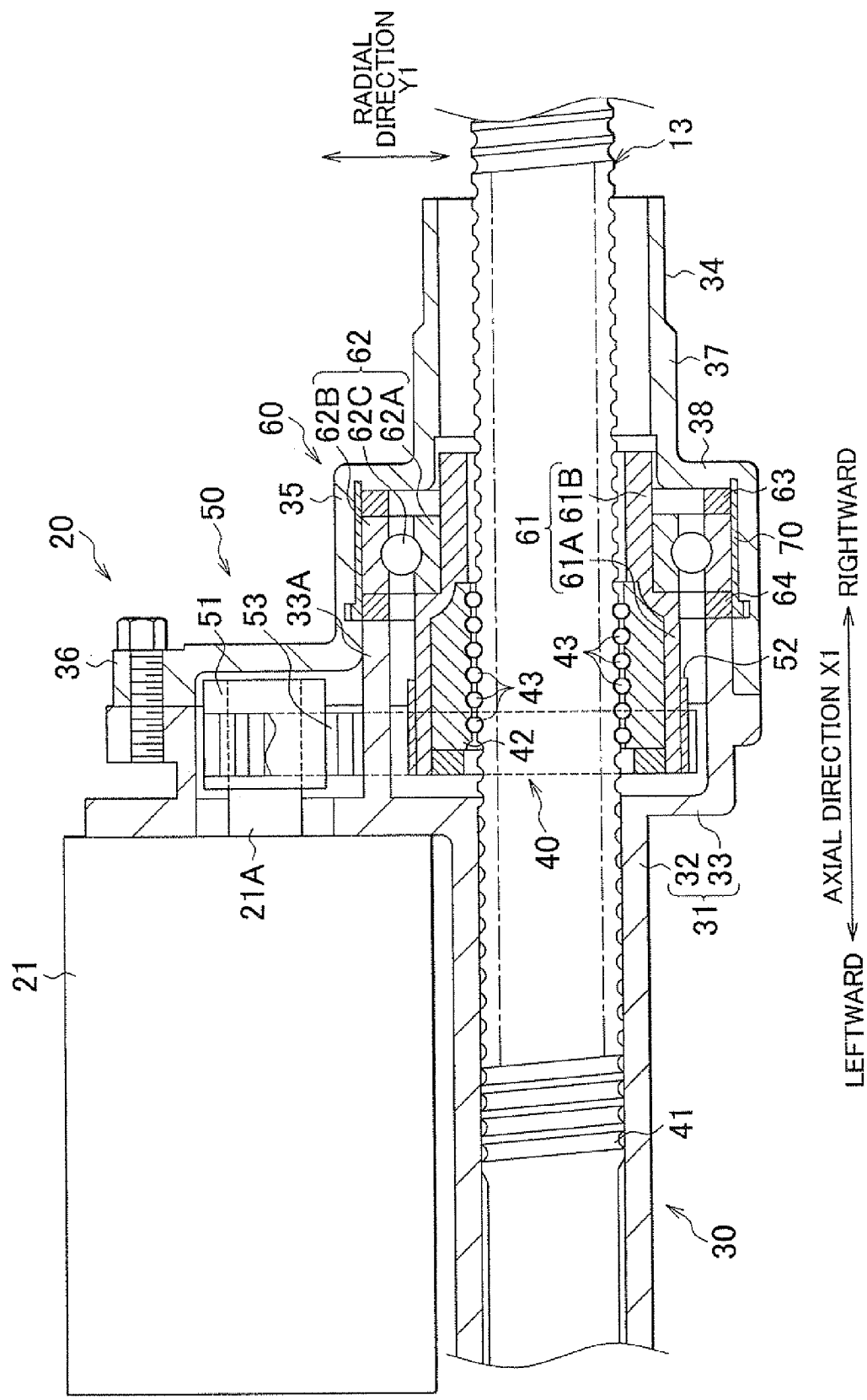
FIG. 2 is a cross-sectional view that shows a cross-sectional structure of the electric power steering device according to the first embodiment.

A detailed configuration of the actuator 20 will be described with reference to FIG. 2. The ball screw device 40 includes a threaded portion 41, a cylindrical ball screw nut 42, and a plurality of balls 43. The threaded portion 41 is a part of the steered shaft 13. The ball screw nut 42 surrounds the threaded portion 41 from the radial direction Y1. The plurality of balls 43 are interposed between the threaded portion 41 and the ball screw nut 42 in the radial direction Y1 of the steered shaft 13.

The threaded portion 41 is provided at a portion of the steered shaft 13 that corresponds to the right end of the first body portion 32 of the first housing 31, the first increased-diameter portion 33, and the second housing 34. Male threads are formed on the outer peripheral surface of the threaded portion 41.

Female threads are formed in the inner peripheral surface of the ball screw nut 42. The balls 43 are accommodated between the male threads of the threaded portion 41 and the female threads of the ball screw nut 42. The ball screw nut 42 rotates about the center axis of the steered shaft 13 via the balls 43.

The support mechanism 60 includes a cylindrical nut case 61, a ball bearing 62, a bush 70, a first elastic element 63, and a second elastic element 64. The ball bearing 62 corresponds to the rolling bearing. The bush 70 corresponds to the plain bearing. The nut case 61 rotates together with the ball screw nut 42. The ball bearing 62 is attached to the nut case 61. The bush 70 is attached to the outer periphery of the ball bearing 62. The first elastic element 63 is disposed at the right of the ball bearing 62 in the axial direction X1. The second elastic element 64 is disposed at the left of the ball bearing 62 in the axial direction X1.

The nut case 61 includes a first attachment portion 61A to which the ball screw nut 42 is attached, and a second attachment portion 61B to which the ball bearing 62 is attached. The ball screw nut 42 is fixed to the inner peripheral surface of the first attachment portion 61A. The first attachment portion 61A corresponds to the first portion of the ball screw device. The second attachment portion 61B corresponds to the second portion of the ball screw device.

The ball bearing 62 includes an inner ring 62A, an outer ring 62B, and rolling elements 62C. The inner ring 62A is attached to the second attachment portion 61B. The outer ring 62B contacts with the bush 70. The rolling elements 62C are interposed between the inner ring 62A and the outer ring 62B in the radial direction Y1.

The second housing 34 includes a coupling portion 38 that couples the second body portion 35 and the reduced-diameter portion 37 to each other. The first elastic element 63 is provided between the coupling portion 38 and the outer ring 62B of the ball bearing 62. The first elastic element 63 contacts both the inner peripheral surface of the coupling portion 38 and the right end surface of the outer ring 62B.

The second elastic element 64 is provided between the first increased-diameter portion 33 of the first housing 31 and the outer ring 62B of the ball bearing 62. The second elastic element 64 contacts both the end surface of the first increased-diameter portion 33 and the left end surface of the outer ring 62B.

The speed reduction mechanism 50 is accommodated in the first increased-diameter portion 33 and the second increased-diameter portion 36. The speed reduction mechanism 50 includes a driving pulley 51, a driven pulley 52, and a belt 53. The driving pulley 51 rotates together with the electric motor 21. The driven pulley 52 rotates together with the ball screw nut 42. The belt 53 transmits rotation of the driving pulley 51 to the driven pulley 52. Toothed pulleys are used as the driving pulley 51 and the driven pulley 52. A toothed belt that meshes with the teeth of the driving pulley 51 and the driven pulley 52 is used as the belt 53.

The driving pulley 51 is attached to the output shaft 21A of the electric motor 21. The driven pulley 52 is attached to the left end of the first attachment portion 61A of the nut case 61. The belt 53 is wound around the driving pulley 51 and the driven pulley 52.

An operation of the speed reduction mechanism 50 and the ball screw device 40 will be described. When the driving pulley 51 is rotated along with rotation of the electric motor 21, rotation of the driving pulley 51 is transmitted to the driven pulley 52 by the belt 53. At this time, the ball screw nut 42 is also rotated together with the driven pulley 52. The balls 43 revolve along with rotation of the ball screw nut 42 to move the steered shaft 13 in the axial direction X1.

Figure 3:
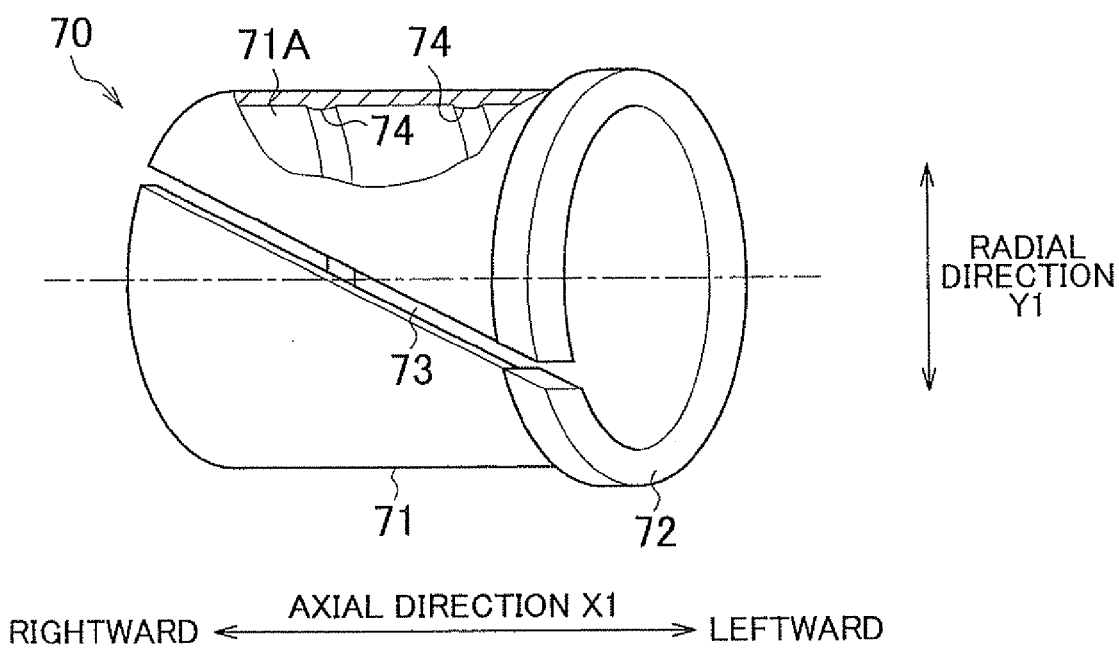
FIG. 3 is a perspective view that shows a perspective structure of a bush in the electric power steering device according to the first embodiment.

The configuration of the bush 70 will be described with reference to FIG. 3. The bush 70 is molded from a polyacetal. The bush 70 includes a body portion 71, a flange 72, and a cut portion 73. The body portion 71 supports the outer ring 62B of the ball bearing 62. The flange 72 is fitted in a second accommodation portion 35C of the second body portion 35. The cut portion 73 is formed across the body portion 71 and the flange 72. That is, the bush 70 has a discontinuous shape obtained by cutting a portion of an annular member.

The cut portion 73 is formed to extend from the right end to the left end of the bush 70. The right end and the left end of the cut portion 73 are located at different positions from each other in the circumferential direction. An inner peripheral surface 71A of the body portion 71 is provided with two projecting portions 74 that project inward in the radial direction Y1. The right projecting portion 74 and the left projecting portion 74 are spaced apart from each other in the axial direction X1. The projecting portions 74 are formed to extend over the entirety of the inner peripheral surface 71A of the body portion 71 in the circumferential direction.

The bush 70 is formed by injection molding using a die that is split into two portions, namely an upper die and a lower die, in the axial direction X1. The amount of projection of the projecting portions 74 from the inner peripheral surface 71A is set such that the die can be removed in the axial direction X1 during injection molding of the bush 70.

Figure 4:
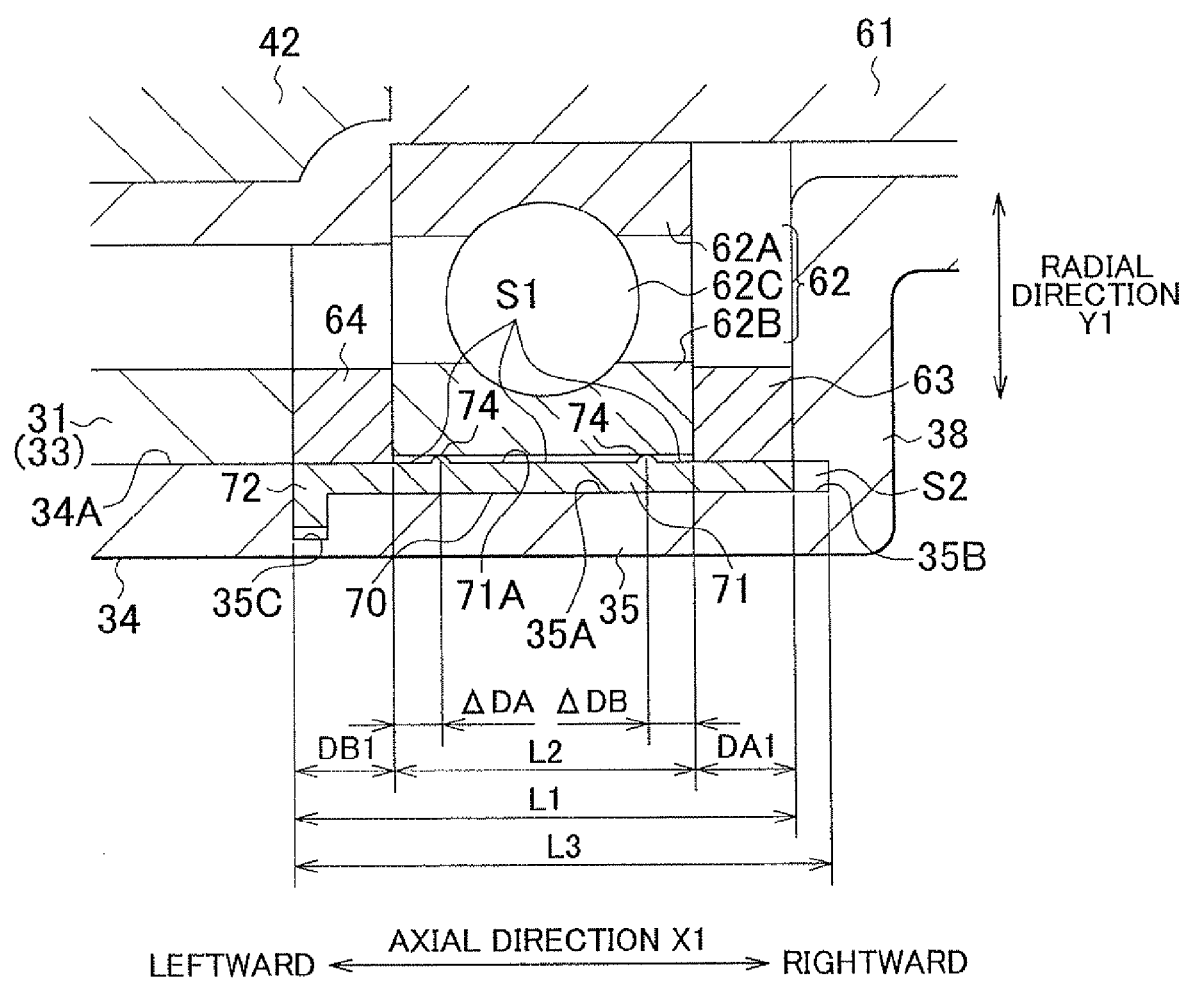
FIG. 4 is a cross-sectional view that shows an enlarged cross-sectional structure of a ball bearing and its surroundings in the electric power steering device according to the first embodiment.

The structure that the bush 70 supports the ball bearing 62 will be described with reference to FIG. 4. An accommodation portion 35A that accommodates the bush 70 is formed in the second body portion 35 of the second housing 34. The accommodation portion 35A includes a first accommodation portion 35B that accommodates the body portion 71 of the bush 70, and the second accommodation portion 35C that accommodates the flange 72 of the bush 70. The second accommodation portion 35C corresponds to the recessed portion that is provided in the second housing 34.

A portion of the inner peripheral surface of the second housing 34 that contacts the outer peripheral surface of the first increased-diameter portion 33 of the first housing 31 (hereinafter referred to as "reference surface 34A") is defined as a reference position in the radial direction Y1 of the steered shaft 13. Then, the depth of the second accommodation portion 35C in the radial direction Y1 is larger than the depth of the first accommodation portion 35B.

The distal ends of the projecting portions 74 of the bush 70 are positioned inwardly of the reference surface 34A in the radial direction Y1, and contact the outer ring 62B of the ball bearing 62. Therefore, a gap S1 is formed between a portion of the inner peripheral surface 71A of the body portion 71 in which the projecting portions 74 are not formed and the outer peripheral surface of the outer ring 62B. In addition, a gap S2 is formed between the right end surface of the bush 70 and the inner peripheral surface of the second housing 34.

A state in which the ball bearing 62 is not subjected to a force that acts in the axial direction X1 is defined as a "reference state". Then, the length of the first elastic element 63 in the axial direction X1 in the reference state is determined as a first reference length DA1. In addition, the length of the second elastic element 64 in the axial direction X1 in the reference state is determined as a second reference length DB1.

When the ball bearing 62 in the reference state is subjected to a force that acts rightward in the axial direction X1, the first elastic element 63 is compressed in the axial direction X1. The first elastic element 63 can be deformed by the force that acts rightward in the axial direction X1 until the length of the first elastic element 63 in the axial direction X1 is reduced to a first compressed length DA2. That is, the maximum compression amount of the first elastic element 63 in the axial direction X1 is determined as a length ΔDA, which is the difference between the first reference length DA1 and the first compressed length DA2.

When the ball bearing 62 in the reference state is subjected to a force that acts leftward in the axial direction X1, the second elastic element 64 is compressed in the axial direction X1. The second elastic element 64 can be deformed by the force that acts leftward in the axial direction X1 until the length of the second elastic element 64 in the axial direction X1 is reduced to a second compressed length DB2. That is, the maximum compression amount of the second elastic element 64 in the axial direction X1 is determined as a length ΔDB, which is the difference between the second reference length DB1 and the second compressed length DB2.

In the bush 70, the distal ends of the projecting portions 74 are positioned with reference to the right end surface and the left end surface of the body portion 71 as follows. That is, the distal end of the projecting portion 74 at the right in the axial direction X1 is provided at a position the length ΔDB away from the right end surface of the body portion 71. The distal end of the projecting portion 74 at the left in the axial direction X1 is provided at a position the length ΔDA away from the left end surface of the body portion 71.

A length L1 of the bush 70 in the axial direction is larger than a length L2 of the ball bearing 62 in the axial direction (that is, L1>L2). The length obtained by adding the first reference length DA1 and the second reference length DB1 to the length L2 (L2+DA1+DB1) is defined as "LX". Then, the length LX is the same as the length L1 (that is, LX=L1). A length L3 of the accommodation portion 35A in the axial direction is larger than the length L1 (that is, L3>L1).

Figure 5A:
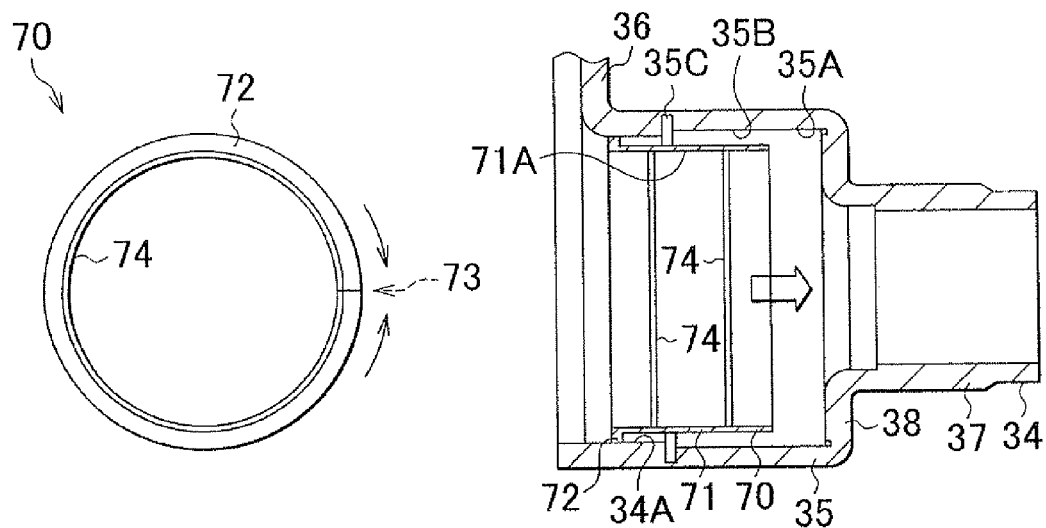
FIGS. 5A and 5B are cross-sectional views that show a cross-sectional structure of a housing and the bush in the electric power steering device according to the first embodiment.

A process of attaching the bush 70 will be described with reference to FIGS. 5A and 5B. As shown in FIG. 5A, both end portions of the body portion 71 and the flange 72 of the bush 70 in the circumferential direction are brought into contact with each other to reduce the size of the body portion 71 in the radial direction Y1 (this state is hereinafter referred to as a "reduced-diameter state"). Then, the bush 70 in the reduced-diameter state is inserted into the second housing 34.

Figure 5B:
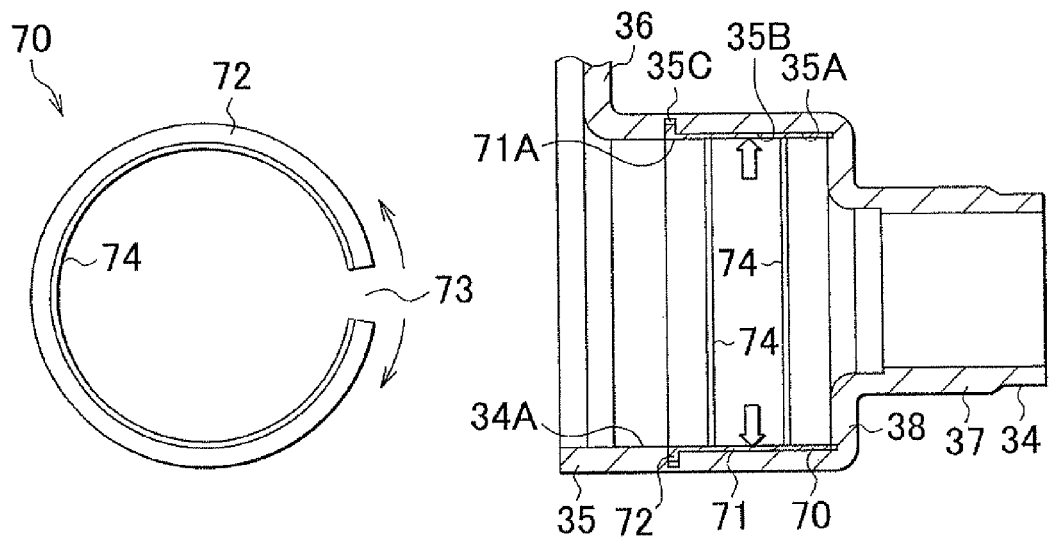

As shown in FIG. 5B, the bush 70 in the reduced-diameter state is inserted until the right end of the body portion 71 contacts the coupling portion 38. Thereafter, the force that has been applied to the bush 70 to bring the bush 70 into the reduced-diameter state is removed. At this time, the bush 70 exerts its restoring force to press the body portion 71 against the first accommodation portion 35B and insert the flange 72 into the second accommodation portion 35C.

Figure 6A:
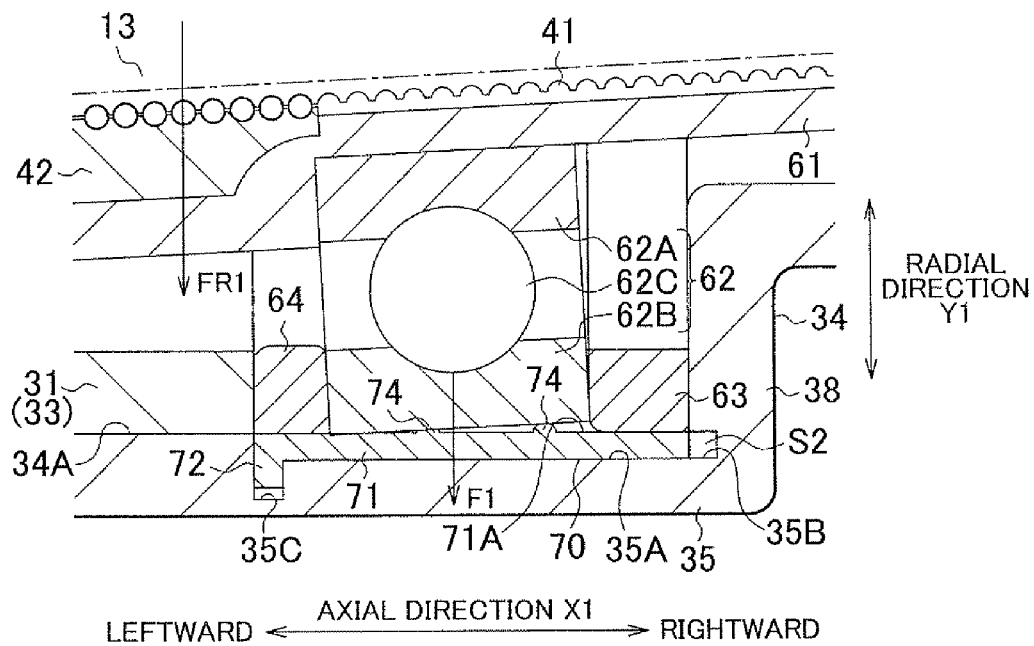
FIGS. 6A and 6B are cross-sectional views that show an enlarged cross-sectional structure of the ball bearing and its surroundings in the electric power steering device according to the first embodiment.

The attitude of the ball bearing 62 upon application of an external force will be described with reference to FIGS. 6A and 6B. As shown in FIG. 6A, when the steered shaft 13 is subjected to an external force FR1 that acts in the radial direction Y1 because the turning wheel runs onto a curb, for example, the outer ring 62B is subjected to a force F1 that presses the ball bearing 62 toward the second housing 34. This causes the ball bearing 62 to be inclined with respect to the second body portion 35 of the second housing 34.

Figure 6B:
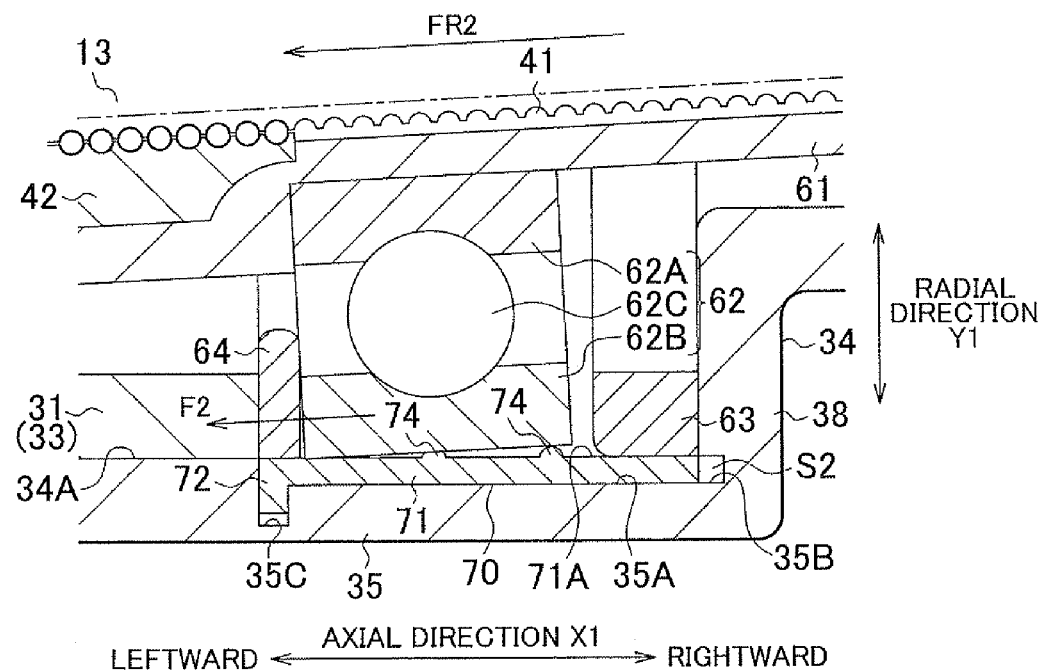

As shown in FIG. 6B, when the steered shaft 13 is subjected to a force FR2 in the axial direction with the ball bearing 62 inclined with respect to the second body portion 35, the outer ring 62B is also subjected to a force F2.

In the case where the bush 70 is not provided in the electric power steering device 1, an edge of the outer ring 62B may be pressed against the second housing 34, and the outer ring 62B may be stuck in the second housing 34.

In the electric power steering device 1 according to the first embodiment in which the bush 70 is provided, the bush 70 hinders contact between an edge of the outer ring 62B and the second housing 34 even if the ball bearing 62 is inclined with respect to the second body portion 35. Therefore, when the outer ring 62B is subjected to the force F2 with the ball bearing 62 inclined with respect to the second body portion 35, an edge of the outer ring 62B slides with respect to the bush 70. This makes it less likely that the outer ring 62B is stuck.

According to the electric power steering device 1 of the first embodiment, the following effects are obtained. The electric power steering device 1 is provided with the support mechanism 60. In the support mechanism 60, the bush 70 is provided between the second body portion 35 of the second housing 34 and the outer ring 62B of the ball bearing 62.

This makes it less likely that the ball bearing 62 is stuck in the second housing 34. This also allows the ball bearing 62 to move smoothly with respect to the second housing 34 in the axial direction X1 of the steered shaft 13.

Figure 8:
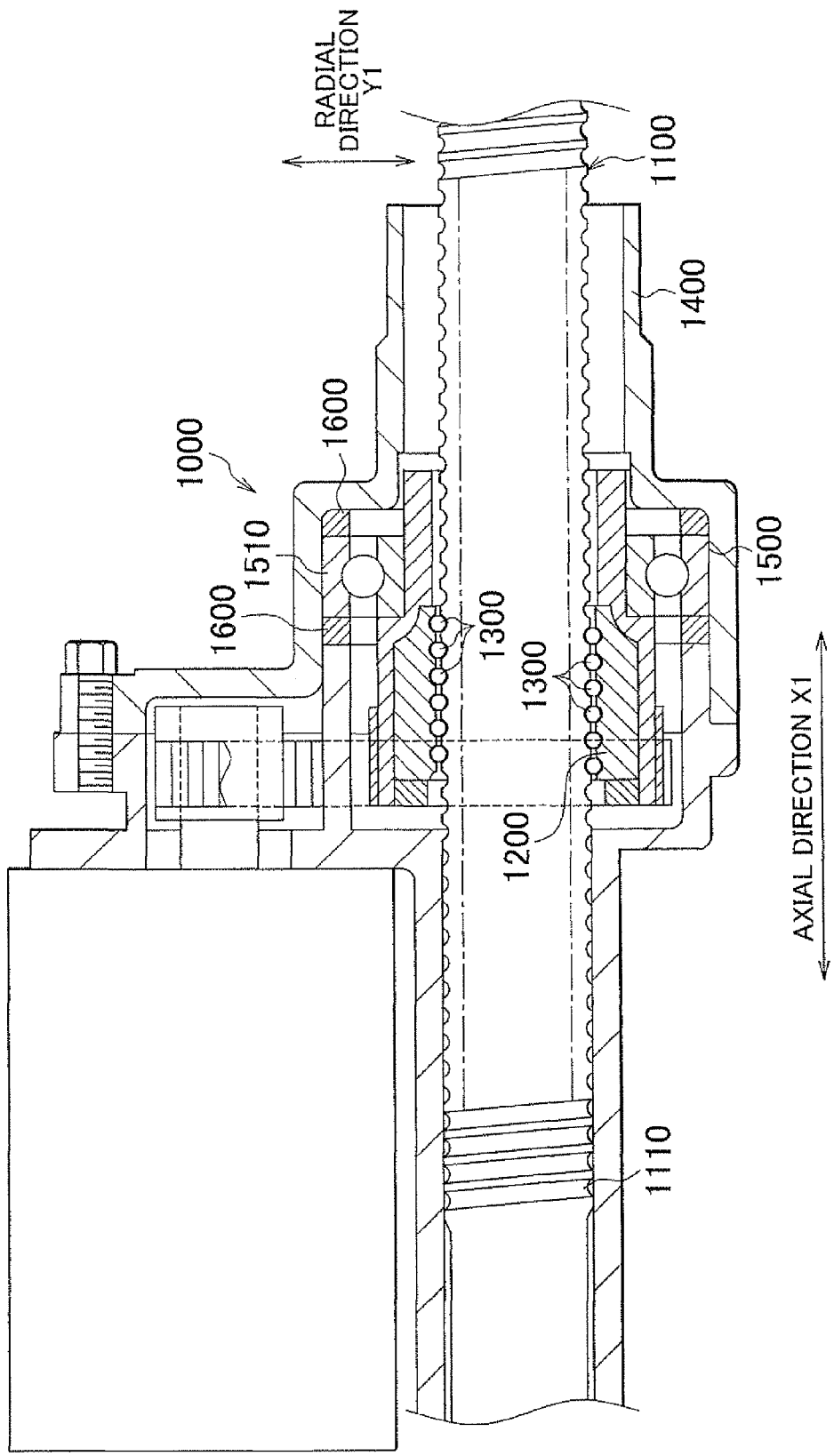
FIG. 8 is a cross-sectional view that shows a cross-sectional structure of an electric power steering device according to the related art.

The rotational center of the ball bearing 62 is adjusted in position with respect to the rotational center of the steered shaft 13 through elastic deformation of the bush 70. Therefore, the coaxiality between the ball bearing 62 and the steered shaft 13 is improved, as compared to the device according to the related art which is shown in FIG. 8.

In the support mechanism 60, the projecting portions 74 are provided on the inner peripheral surface 71A of the body portion 71 of the bush 70. This reduces the area of contact between the ball bearing 62 and the bush 70, which allows the ball bearing 62 to move more smoothly with respect to the bush 70.

In the support mechanism 60, the flange 72 of the bush 70 is fitted in the second accommodation portion 35C (recessed portion) of the accommodation portion 35A of the second housing 34. Therefore, contact between the flange 72 and the second accommodation portion 35C makes the bush 70 less likely to move in the axial direction X1 when the bush 70 is subjected to a force that acts in the axial direction X1.

In the support mechanism 60, the cut portion 73 is provided in the bush 70. This makes it possible to reduce the diameter of the bush 70 when the bush 70 is attached to the second housing 34, which facilitates attachment of the bush 70 to the second housing 34.

In the support mechanism 60, only the second attachment portion 61B, of the first attachment portion 61A and the second attachment portion 61B of the nut case 61, is supported by the ball bearing 62. Therefore, the nut case 61 tends to be inclined with respect to the second housing 34 as compared to a structure in which both the first attachment portion 61A and the second attachment portion 61B are supported by a bearing. When the nut case 61 is inclined, the ball bearing 62 is also inclined accordingly. Therefore, an edge of the outer ring 62B tends to be pressed against the second housing 34.

In the support mechanism 60 according to the first embodiment in which the bush 70 is provided as discussed above, the bush 70 makes an edge of the outer ring 62B and the second housing 34 less likely to contact each other even if the ball bearing 62 is inclined along with inclination of the nut case 61.

In the support mechanism 60, the length L1 of the bush 70 in the axial direction is larger than the length L2 of the ball bearing 62 in the axial direction. This reliably makes it less likely that the outer ring 62B contacts the second housing 34 as compared to a case where the length L1 is smaller than the length L2.

In the support mechanism 60, when the length obtained by adding the maximum compression amount ΔDA of the first elastic element 63 and the maximum compression amount ΔDB of the second elastic element 64 to the length L2 of the ball bearing 62 in the axial direction is defined as "LY", the length L1 of the bush 70 is larger than the length LY (that is, L1>LY).

Therefore, the outer ring 62B is kept in the bush 70 both when the first elastic element 63 is deformed to the maximum compression amount and when the second elastic element 64 is deformed to the maximum compression amount. This reliably makes it less likely that the outer ring 62B contacts the second housing 34.

In the support mechanism 60, the bush 70 is provided with at least two projecting portions 74. The right projecting portion 74 is provided at a position the length ΔDB away from the right end surface of the body portion 71. The left projecting portion 74 is provided at a position the length ΔDA away from the left end surface of the body portion 71.

According to the configuration described above, the distal end of the left projecting portion 74 is maintained in contact with the outer ring 62B even when the first elastic element 63 is compressed to the maximum compression amount as the outer ring 62B moves rightward in the axial direction X1 with respect to the second housing 34. That is, both the projecting portions 74 are maintained in contact with the outer ring 62B. This makes it less likely that the ball bearing 62 is inclined because the left projecting portion 74 and the outer ring 62B no longer contact each other.

Also, the distal end of the right projecting portion 74 is maintained in contact with the outer ring 62B even when the second elastic element 64 is compressed to the maximum compression amount as the outer ring 62B moves leftward in the axial direction X1 with respect to the second housing 34. That is, both the projecting portions 74 are maintained in contact with the outer ring 62B. This makes it less likely that the ball bearing 62 is inclined because the right projecting portion 74 and the outer ring 62B no longer contact each other.

In the device according to the related art shown in FIG. 8, the rolling bearing 1500 is loose-fitted in the housing 1400. Therefore, the rolling bearing 1500 and the housing 1400 hit each other when the steered shaft 1100 is subjected to a force that acts in the radial direction Y1. In the electric power steering device 1 according to the first embodiment, in contrast, the bush 70 hinders Contact between the ball bearing 62 and the second housing 34. This makes it less likely that the ball bearing 62 and the second housing 34 generate a crashing sound when the steered shaft 13 is subjected to a force in the radial direction Y1.

The specific configuration of the electric power steering device according to the present invention is not limited to the first embodiment described above, and may be modified as follows, for example. The following modifications are not only applied to the first embodiment described above, and different modifications may be combined with each other.

In the first embodiment described above, the length L1 of the bush 70 is larger than the length L2 of the ball bearing 62. However, the length L1 may be the same as the length L2. Alternatively, the length L1 may be smaller than the length L2.

In the first embodiment described above, the length L1 of the bush 70 is the same as the length LX. However, the length L1 may be larger than the length LX. Alternatively, the length L1 may be smaller than the length LX.

In the first embodiment described above, the length L1 of the bush 70 is larger than the length LY. However, the length L1 may be the same as the length LY. Alternatively, the length L1 may be smaller than the length LY.

In the first embodiment described above, as shown in FIG. 4, the flange 72 is provided at the left end of the body portion 71 of the bush 70. However, the flange 72 may be provided at the right end of the body portion 71. In this case, the second accommodation portion 35C is formed at the right end of the accommodation portion 35A. Alternatively, the flange 72 may be provided at the center of the body portion 71. In this case, the second accommodation portion 35C is formed at the center of the accommodation portion 35A.

In the first embodiment described above, the accommodation portion 35A may be omitted from the second body portion 35 of the second housing 34. In this case, the second accommodation portion 35C may be provided in the inner peripheral surface of the second body portion 35.

In the first embodiment described above, the flange 72 may be omitted. In this case, the second accommodation portion 35C may be omitted from the accommodation portion 35A. In the first embodiment described above, the bush 70 is provided with two projecting portions 74. However, one or three or more projecting portions 74 may be provided.

In the first embodiment described above, the projecting portions 74 may be omitted. In this case, the outer ring 62B contacts the inner peripheral surface 71A of the body portion 71 of the bush 70. In the first embodiment described above, the left end and the right end of the cut portion 73 are located at different positions from each other in the circumferential direction. However, the left end and the right end of the cut portion 73 may be located at the same position as each other in the circumferential direction.

In the first embodiment described above, the cut portion 73 may be omitted. In this case, the flange 72 may be additionally omitted. This facilitates insertion of the bush 70 into the second housing 34.

In the first embodiment described above, a polyacetal is used as the material of the bush 70. However, a nylon, a polyamide, or a polytetrafluoroethylene may be used in place of the polyacetal. In short, any resin material other than the polyacetal that provides an excellent self-lubricating effect may be used as the material of the bush 70 to achieve an effect that is similar to the effect achieved by the first embodiment described above.

In the first embodiment described above, the gap S1 between the outer ring 62B of the ball bearing 62 and the body portion 71 of the bush 70 may be filled with grease that serves as a lubricant. This allows the ball bearing 62 to move more smoothly with respect to the body portion 71.

Figure 7A:
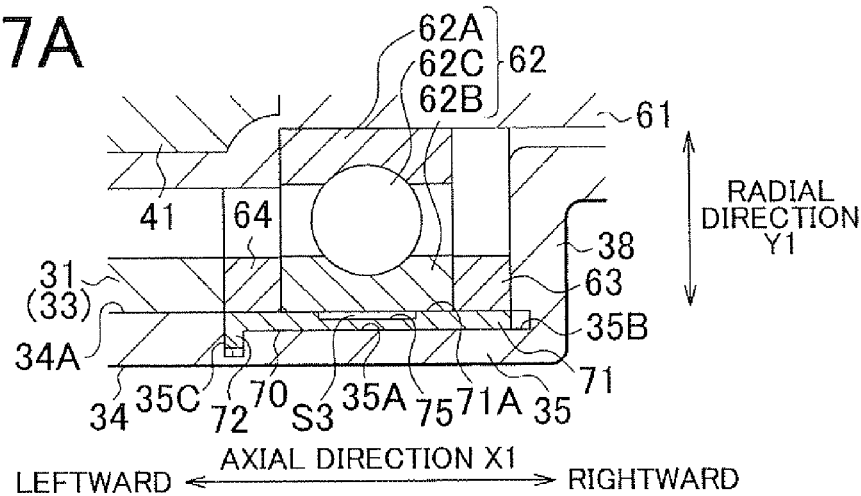
FIG. 7A is a cross-sectional view that shows a cross-sectional structure of a ball bearing and its surroundings in an electric power steering device according to a second embodiment of the present invention.

The structure of the first embodiment described above may be modified as in a second embodiment that is shown in FIG. 7A, in which the projecting portions 74 are omitted from the bush 70 and a recessed portion 75 is formed in the body portion 71. In this case, a gap S3 that is formed between the recessed portion 75 and the outer ring 62B in the radial direction Y1 may be filled with grease.

Figure 7B:
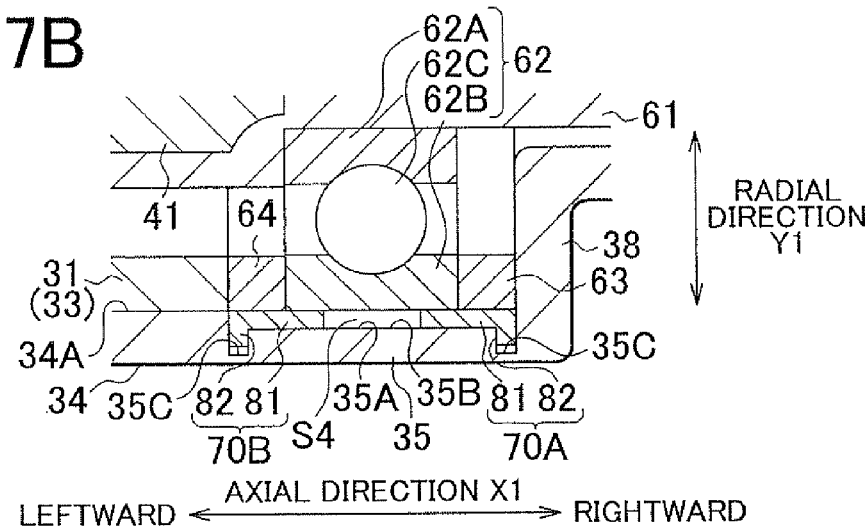
FIG. 7B is a cross-sectional view that shows a cross-sectional structure of a ball bearing and its surroundings in an electric power steering device according to a third embodiment of the present invention.

The structure of the first embodiment described above may be modified as in a third embodiment that is shown in FIG. 7B, in which the bush 70 is divided into a first bush 70A and a second bush 70B. In the third embodiment, the first bush 70A is provided at the right end of the outer ring 62B of the ball bearing 62. The second bush 70B is provided at the left end of the outer ring 62B. The first bush 70A and the second bush 70B have the same shape as each other. Each of the bushes 70A and 70B includes a body portion 81 that contacts the outer ring 62B, and a flange 82 that extends from the body portion 81 toward the housing 30. The accommodation portion 35A is formed in the housing 30 at positions that correspond to the bushes 70A and 70B. The second accommodation portion 35C is formed in the accommodation portion 35A at positions that correspond to the flanges 82. In this configuration, a gap S4 that is formed between the body portions 81 of the bushes 70A and 70B may be filled with grease.

Figure 7C:
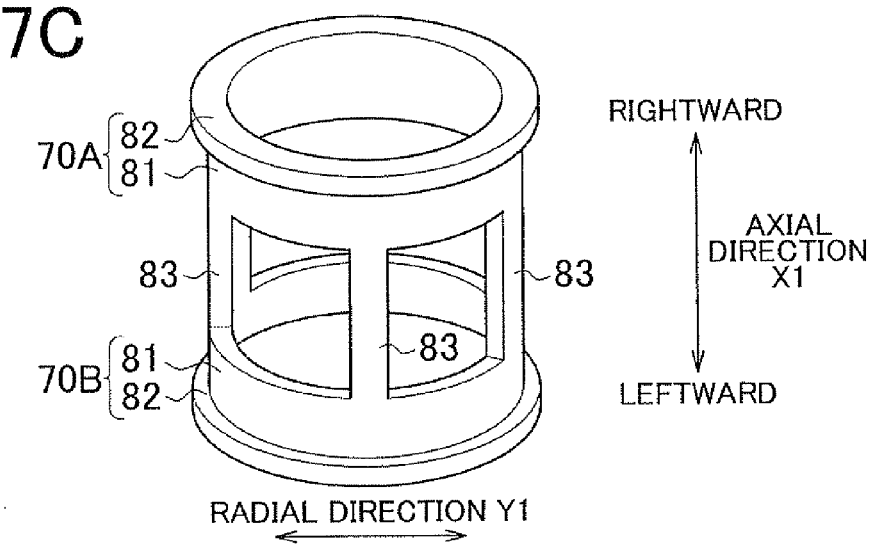
FIG. 7C is a perspective view that shows a perspective structure of a bush in an electric power steering device according to a fourth embodiment of the present invention.

The first bush 70A and the second bush 70B in the third embodiment of FIG. 7B may be coupled to each other into a single member by a plurality of coupling portions 83 as in the structure of a fourth embodiment that is shown in FIG. 7C. In the embodiments described above, the ball bearing 62 which serves as the rolling bearing may be replaced with other rolling bearings such as a roller bearing. Such a bearing is not limited to a single-row rolling bearing, and a double-row rolling bearing may also be used. Such a bearing is not limited to a rolling bearing, and a plain bearing may also be used.

In the first embodiment described above, the speed reduction mechanism 50 which includes the driving pulley 51, the driven pulley 52, and the belt 53 is used. However, the speed reduction mechanism 50 may be replaced with a speed reduction mechanism that includes a driving sprocket, a driven sprocket, and a chain.

In the first embodiment described above, the present invention is applied to the electric power steering device 1 in which the body portion of the electric motor 21 is provided outside the housing 30. However, the present invention may also be applied to an electric power steering device in which the body portion of the electric motor is provided in the housing 30. In such a device, the electric motor is provided inside the second housing 34 of the housing 30. An inner-rotor motor is used as the electric motor. That is, the electric motor includes a magnetic rotor that surrounds the steered shaft 13 in the radial direction Y1, and an armature that surrounds the rotor in the radial direction Y1 and that is fixed to the second housing 34. The rotor is coupled to the nut case. This allows the nut case to rotate together with the rotor. The body portion of the electric motor may be provided inside the first housing 31.

In the first to forth embodiments, the resin plain bearing is provided between the housing and the outer ring of the rolling bearing, which hinders the rolling bearing from contacting the housing. This makes it less likely that the rolling bearing is stuck in the housing.

In the electric power steering device according to the first embodiment, the plain bearing may be provided with a projecting portion that projects toward the outer ring. The projecting portion reduces the area of contact between the outer ring of the rolling bearing and the plain bearing. This reduces a friction force generated between the plain bearing and the rolling bearing, which allows the rolling bearing to move smoothly with respect to the plain bearing.

In the electric power steering device according to the first to forth embodiments, the plain bearing may include a flange that projects toward the housing in a radial direction of the steered shaft, and the flange may be fitted in a recessed portion of the housing.

According to the above, the flange is fitted in the recessed portion. Therefore, contact between the flange and the recessed portion makes the plain bearing less likely to move when the plain bearing is subjected to a force that moves the plain bearing with respect to the housing in the axial direction of the steered shaft.

In the electric power steering device according to the first embodiment, the plain bearing may have a discontinuous shape obtained by cutting a portion of an annular member.

According to the above, the diameter of the plain bearing can be reduced by bringing one end portion and the other end portion of the plain bearing closer to each other at a cut portion of the plain bearing when attaching the plain bearing to the housing. This facilitates insertion of the plain bearing into the housing.

In the electric power steering device according to the first to forth embodiments, the plain bearing may be formed from a polyacetal, a nylon, a polyamide, or a polytetrafluoroethylene.

In the electric power steering device according to the first to forth embodiments, the ball screw device may include a first portion that includes one end portion of the ball screw device in the axial direction of the rolling bearing, a second portion that includes the other end portion of the ball screw device in the axial direction of the rolling bearing, and a belt or a chain that transmits rotation of the electric motor to the ball screw device. The belt or the chain may be wound around the first portion in the axial direction of the rolling bearing. The rolling bearing may support the second portion in the axial direction of the rolling bearing.

In the above, only one of the end portions of the ball screw device in the axial direction of the steered shaft is supported by a rolling bearing. Therefore, the rolling bearing tends to be inclined with respect to the housing, as compared to a configuration in which both the end portions of the ball screw device are supported by a rolling bearing. When the ball screw device is inclined, the rolling bearing is also inclined accordingly. Therefore, the rolling bearing may be pressed against the housing.

In such a configuration, the plain bearing contacts the rolling bearing. Therefore, the plain bearing makes the rolling bearing and the housing less likely to contact each other even if the rolling bearing is inclined along with inclination of the ball screw device.

Figure 9:
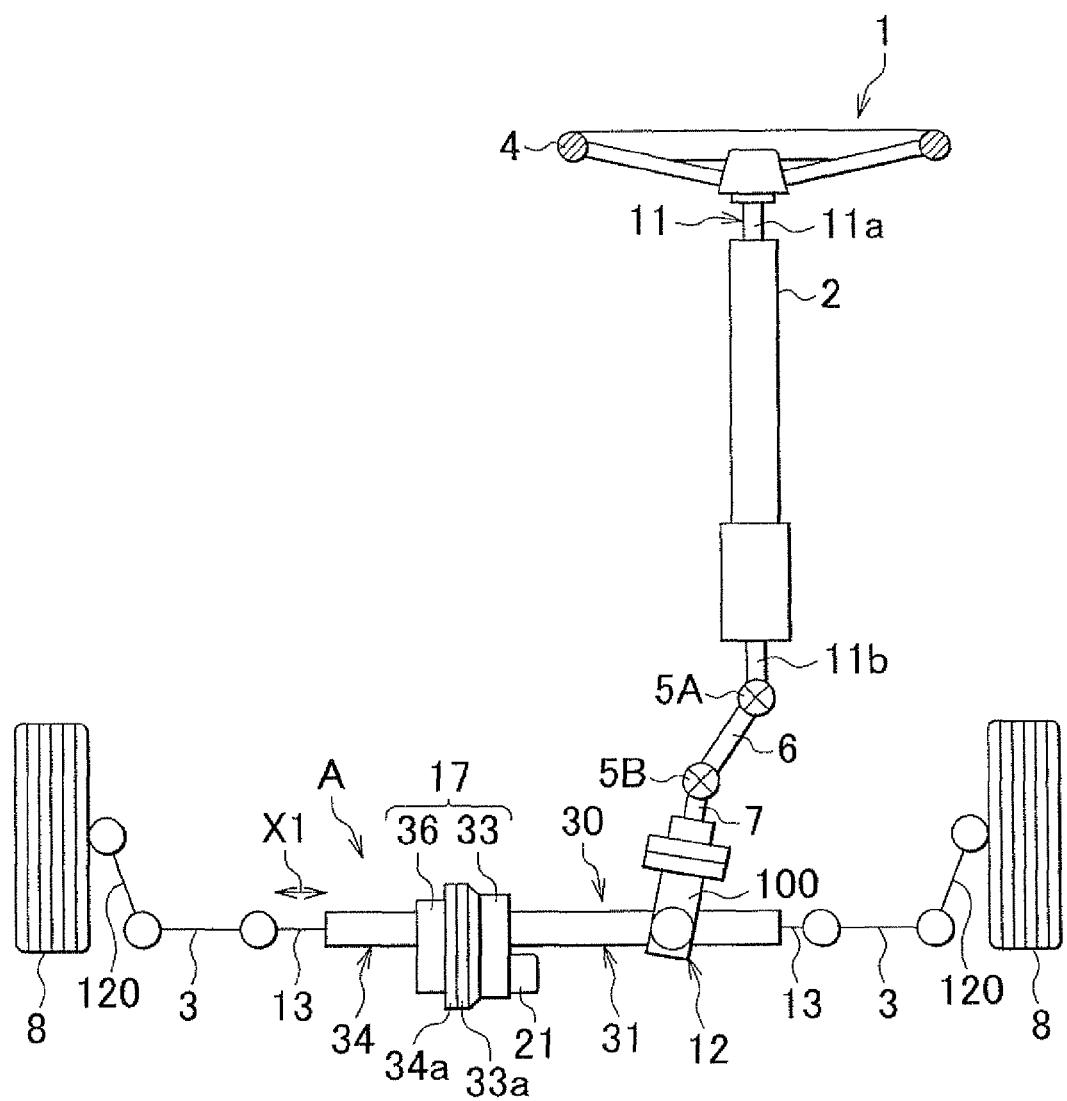
FIG. 9 is a schematic diagram that shows a schematic configuration of an electric power steering device according to a fifth embodiment of the present invention.

Subsequently, a fifth embodiment of the present invention will be described. FIG. 9 is a schematic diagram that shows the overall configuration of a vehicle steering device. An electric power steering device 1 includes a steering shaft 11 that is rotatably supported by a steering column 2 that is fixed to a vehicle body. A steering wheel 4 is attached to an upper end 11a of the steering shaft 11. A lower end 11b of the steering shaft 11 is connected to a pinion shaft 7 via a universal joint 5A, an intermediate shaft 6, and a universal joint 5B.

A steered shaft 13 is disposed horizontally at the lower front portion of the vehicle body with the axial direction X1 directed in the left-right direction of the vehicle body. The steered shaft 13 is supported on a housing 30 which is provided at the lower portion of the vehicle body so as to be slidable in the axial direction X1. The steered shaft 13 is supported by the housing 30 so as not to be rotatable about the axis of the steered shaft 13. The housing 30 includes a pinion housing 100 that is positioned to one side in the axial direction X1. The pinion shaft 7 is rotatably supported on the pinion housing 100.

A pinion (not shown) is provided at an end portion of the pinion shaft 7 in the pinion housing 100. The pinion meshes with a rack (not shown) that is provided on the steered shaft 13 over an appropriate length. With such a configuration, rotation of the pinion shaft 7 causes the steered shaft 13 to slide in the axial direction X1. A turning mechanism A is formed by a rack and pinion mechanism 12 using the pinion shaft 7 and the steered shaft 13.

Left and right turning wheels 8 are respectively coupled to end portions of the steered shaft 13 via a tie rod 3 and a knuckle arm 120. Rotating the steering wheel 4 slides the steered shaft 13 in the axial direction X1 to steer the turning wheels 8. The housing 30 is formed by combining a first tubular housing 31, which includes the pinion housing 100, and a second tubular housing 34 with each other. Specifically, the housing 30 includes a first increased-diameter portion 33 which is formed by increasing the diameter of an end portion of the first housing 31, a second increased-diameter portion 36 which is formed by increasing the diameter of an end portion of the second housing 34, and end portions 33a and 34a that have a flange shape and face each other. The first increased-diameter portion 33 and the second increased-diameter portion 36 are coupled to each other by coupling screws (not shown) with the end portions 33a and 34a abutting against each other.

Figure 10:
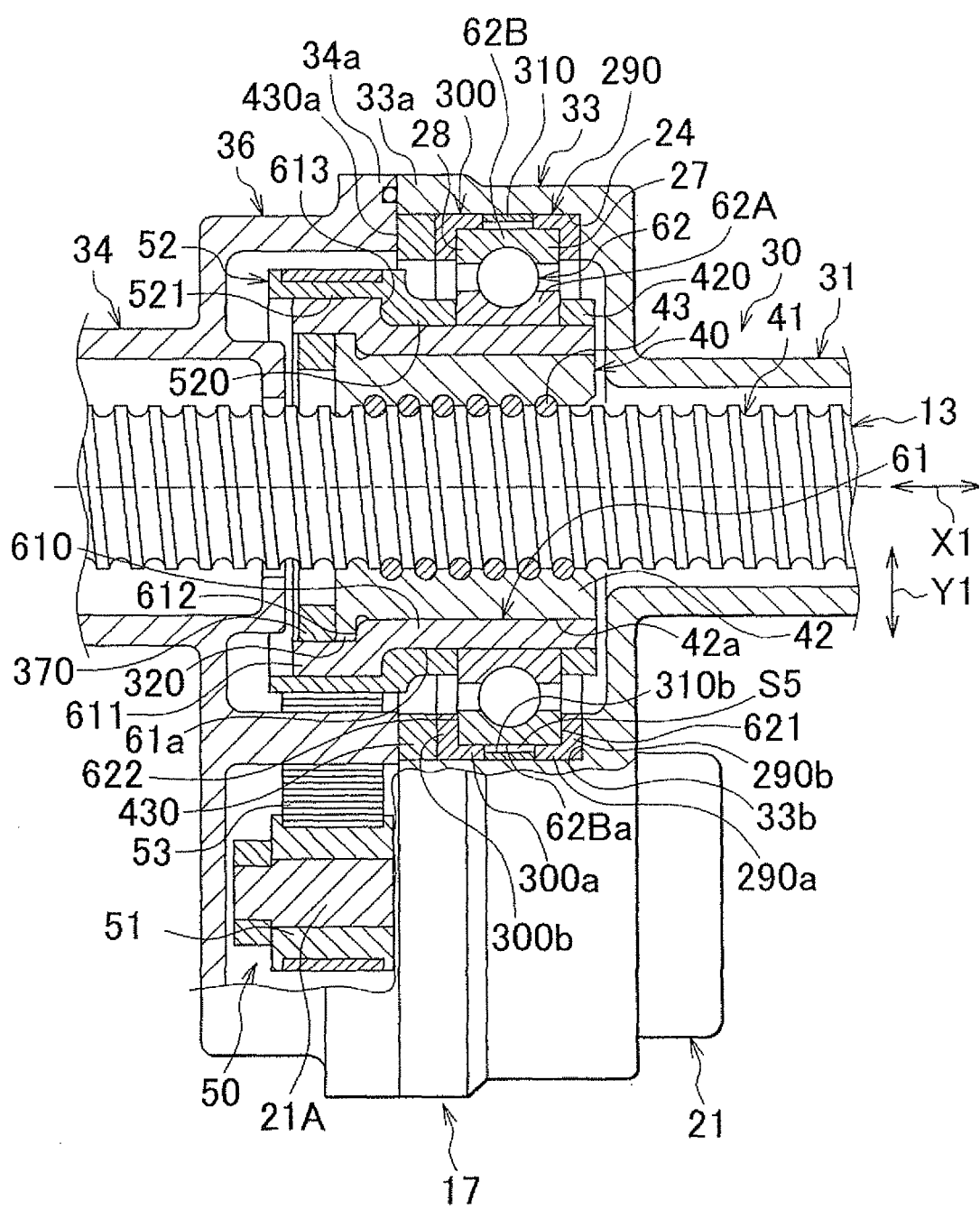
FIG. 10 is a partial cross-sectional view of the electric power steering device.

The first increased-diameter portion 33 and second increased-diameter portion 36, that coupled each other, form a mechanism accommodation housing 17 to be discussed later. An electric motor 21 that generates a steering assist force is integrally retained on the first increased-diameter portion 33. As shown in FIG. 10, the electric power steering device 1 includes the electric motor 21, a speed reduction mechanism 50 which is a pulley-belt mechanism, a ball screw device 40, and the mechanism accommodation housing 17. The speed reduction mechanism 50 decelerates rotation of the electric motor 21. The ball screw device 40 is a conversion mechanism that converts rotation output from the speed reduction mechanism 50 into movement of the steered shaft 13 in the axial direction X1. The mechanism accommodation housing 17 accommodates the speed reduction mechanism 50 and the ball screw device 40.

The speed reduction mechanism 50 includes a driving pulley 51, a driven pulley 52, and a belt 53. The driving pulley 51 is driven by the electric motor 21. The driven pulley 52 is disposed to surround the steered shaft 13. The belt 53 is wound around the driving pulley 51 and the driven pulley 52 to couple the driving pulley 51 and the driven pulley 52 to each other. The driving pulley 51 and the driven pulley 52 are toothed pulleys. The belt 53 is a toothed belt. The driving pulley 51 is tubular in shape, and coupled to a rotary shaft 21A of the electric motor 21 so as to be rotatable together with the rotary shaft 21A.

The ball screw device 40 which serves as a conversion mechanism includes a threaded portion 41 and a ball screw nut 42. The threaded portion 41 is formed on a part of the steered shaft 13. The ball screw nut 42 is threadably engaged with the threaded portion 41 via balls 43. The ball screw nut 42 is coupled to the driven pulley 52 so as to rotate together with the driven pulley 52 and so as not to be relatively movable in the axial direction with respect to the driven pulley 52. The ball screw device 40 includes a ball bearing 62, a third elastic element 290, a fourth elastic element 300, and an annular radial stopper 310. The ball bearing 62 is retained by a bearing retaining portion 24 of the mechanism accommodation housing 17 to rotatably support the ball screw nut 42. The third elastic element 290 and the fourth elastic element 300 receive a first end portion 27 and a second end portion 28, respectively, of an outer ring 62B of the ball bearing 62 to elastically support the outer ring 62B in the axial direction X1 and the radial direction Y1. The radial stopper 310 is disposed between the third elastic element 290 and the fourth elastic element 300, and fitted to be retained on the bearing retaining portion 24. The bearing retaining portion 24 is provided at the inner periphery of an outer peripheral wall of the first increased-diameter portion 33.

Figure 11:
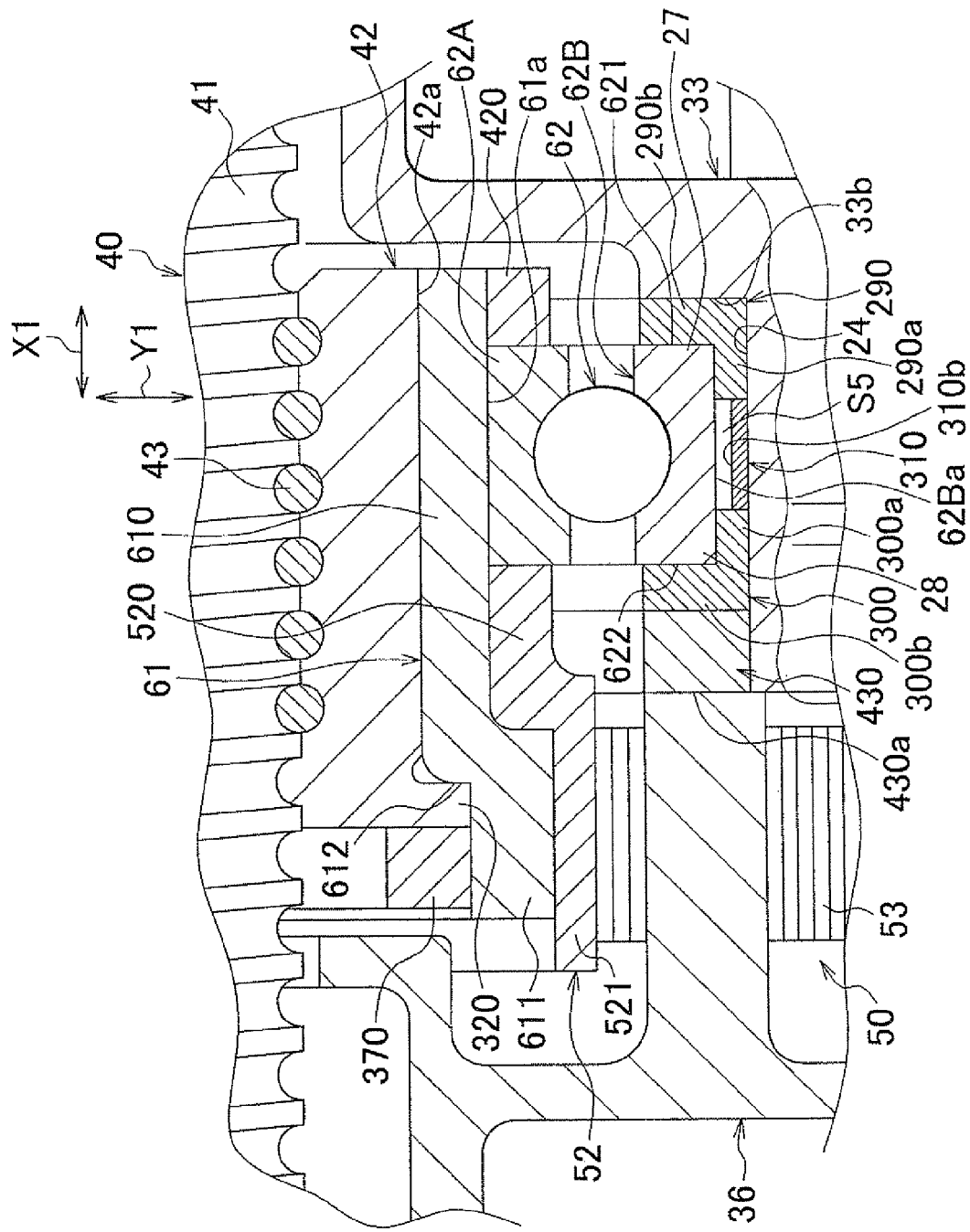
FIG. 11 is an enlarged view of an essential portion of FIG. 10, which shows a state during a non-assisting period.

As shown in FIG. 10 and FIG. 11, which is an enlarged view of FIG. 10, the third elastic element 290 includes a first cylindrical portion 290a that extends along an outer periphery 62Ba of the outer ring 62B, and a first annular flange portion 290b that extends radially inward from an end portion of the first cylindrical portion 290a along a first end surface 621 of the outer ring 62B. The fourth elastic element 300 includes a second cylindrical portion 300a that extends along the outer periphery 62Ba of the outer ring 62B, and a second annular flange portion 300b that extends radially inward from an end portion of the second cylindrical portion 300a along a second end surface 622 of the outer ring 62B. A urethane resin, for example, may be used as the material of the third elastic element 290 and the fourth elastic element 300.

The radial stopper 310 is interposed between the first cylindrical portion 290a of the third elastic element 290 and the second cylindrical portion 300a of the fourth elastic element 300. Specifically, the radial stopper 310 is interposed between opposing end portions of the first cylindrical portion 290a and the second cylindrical portion 300a. The same metallic material as the material of the mechanism accommodation housing 17, for example an aluminum alloy, may be used as the material of the radial stopper 310. A hard synthetic resin may also be used as the material of the radial stopper 310.

During a non-assisting period, the belt 53 exerts its tension to generate an urging force that urges the driven pulley 52 toward the driving pulley 51. The urging force elastically compresses the first cylindrical portion 290a of the third elastic element 290 and the second cylindrical portion 300a of the fourth elastic element 300. Thus, during a non-assisting period, the first cylindrical portion 290a and the second cylindrical portion 300a are elastically compressed so that a gap S5 with a predetermined size is formed between a predetermined portion of an inner periphery 310b of the radial stopper 310 and a predetermined portion of the outer periphery 62Ba of the outer ring 62B.

The predetermined portion of the inner periphery 310b of the radial stopper 310 includes a portion of the inner periphery 310b that is closest to the driving pulley 51. The predetermined portion of the outer periphery 62Ba of the outer ring 62B includes a portion of the outer periphery 62Ba that is closest to the driving pulley 51. An annular flange 320 that extends radially outward is provided at one end of the ball screw nut 42. A tubular nut case 61 is coupled to an outer periphery 42a of the ball screw nut 42 so as to be rotatable together with the ball screw nut 42. The driven pulley 52 is coupled to an outer periphery 61a of the nut case 61 so as to be rotatable together with the nut case 61.

The tubular nut case 61 includes a small-diameter portion 610 that extends along the outer periphery 42a of the ball screw nut 42, and a large-diameter portion 611 that extends along the outside diameter of the annular flange 320 of the ball screw nut 42. A stepped portion 612 is formed at the inner periphery of the nut case 61 between the small-diameter portion 610 and the large-diameter portion 611. An annular threaded member 370 is screwed into a threaded portion in the inner periphery of the large-diameter portion 611 of the nut case 61. With the annular flange 320 of the ball screw nut 42 held between the annular threaded member 370 and the stepped portion 612, the ball screw nut 42 and the nut case 61 are coupled to each other so as to be rotatable together and so as not to be relatively movable in the axial direction. A stepped portion 613 is formed at the outer periphery 61a of the nut case 61 between the small-diameter portion 610 and the large-diameter portion 611.

On the other hand, the driven pulley 52 is tubular in shape, and extends along the outer periphery 61a of the nut case 61. Specifically, the driven pulley 52 includes a small-diameter portion 520 and a large-diameter portion 521. The small-diameter portion 520 of the driven pulley 52 is provided to extend along the outer periphery of the small-diameter portion 610 of the nut case 61. The large-diameter portion 521 of the driven pulley 52 is provided to extend along the outer periphery of the large-diameter portion 611 of the nut case 61. The small-diameter portion 520 of the driven pulley 52 and the inner ring 62A of the ball bearing 62 are fitted on the outer periphery of the small-diameter portion 610 of the nut case 61. In addition, a nut 420 is threadably fitted on the outer periphery of the small-diameter portion 610. This allows the small-diameter portion 520 of the driven pulley 52 and the inner ring 62A of the ball bearing 62 to be held between the stepped portion 613 of the nut case 61 and the nut 420. As a result, the driven pulley 52 and the inner ring 62A of the ball bearing 62 are coupled to the nut case 61 so as to be rotatable together and so as not to be relatively movable in the axial direction.

The first cylindrical portion 290a of the third elastic element 290 and the second cylindrical portion 300a of the fourth elastic element 300 are interposed as elastically compressed between the outer periphery 62Ba of the outer ring 62B of the ball bearing 62 and the bearing retaining portion 24 at the inner periphery of the first increased-diameter portion 33. The radial stopper 310 is fitted with the bearing retaining portion 24 at the inner periphery of the first increased-diameter portion 33. The first annular flange portion 290b of the third elastic element 290 is interposed between a stepped portion 33b of the first increased-diameter portion 33 and a first end surface 621 of the outer ring 62B of the ball bearing 62. In addition, the second annular flange portion 300b of the fourth elastic element 300 is interposed between an annular spacer 430 and a second end surface 622 of the outer ring 62B of the ball bearing 62. The spacer 430 is loosely fitted at the inner periphery of the first increased-diameter portion 33 with an end surface 430a of the spacer 430 abutting against an end surface of the second increased-diameter portion 36.

According to the embodiment, when assisting is not performed as shown in FIG. 10, the belt 53 exerts its tension to generate an urging force that urges the driven pulley 52 toward the driving pulley 51 (downward in FIG. 10). The urging force and an elastic repulsion force of the third elastic element 290 and the fourth elastic element 300 are balanced against each other so that a predetermined gap S5 is secured between a predetermined portion of the outer periphery 62Ba of the outer ring 62B of the ball bearing 62 (which includes a portion of the outer periphery 62Ba that is closest to the driving pulley 51) and a predetermined portion of the inner periphery 310b of the radial stopper 310 (which includes a portion of the inner periphery 310b that is closest to the driving pulley 51) as shown in FIG. 11.

Thus, when assisting starts, a corresponding one of the annular flange portions 290b and 300b of a corresponding one of the third elastic element 290 and the fourth elastic element 300 is elastically deformed before the steered shaft 13 which is going to move in the axial direction X1 becomes free from the friction of the ball screw device 40. Such elastic deformation allows the steered shaft 13 to start moving smoothly in the axial direction X1 together with the ball bearing 62 and the ball screw nut 42. Thus, a good steering feeling is offered when assisting starts.

Figure 12:
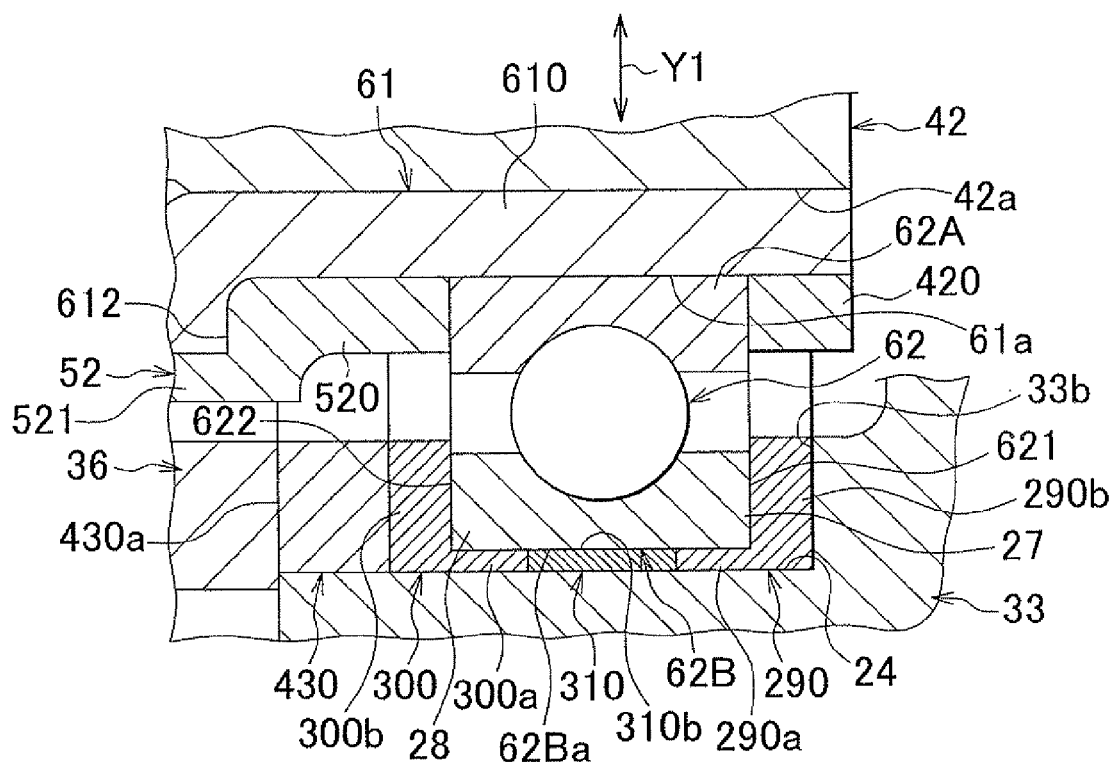
FIG. 12 is a schematic cross-sectional view of an essential portion of the electric power steering device, which shows a state during an assisting period.

During an assisting period, the tension of the belt 53 is higher as compared to that during a non-assisting period. Therefore, the cylindrical portion 290a or 300a of the third elastic element 290 or the fourth elastic element 300 is compressed by the tension so that the size of the gap between the predetermined portion at the outer periphery 62Ba of the outer ring 62B of the ball bearing 62 and the predetermined portion at the inner periphery 310b of the radial stopper 310 is brought to zero as shown in FIG. 12. That is, the predetermined portion at the outer periphery 62Ba of the outer ring 62B of the ball bearing 62 is received by the radial stopper 310.

Thus, the center distance between the driving pulley 51 and the driven pulley 52 is not excessively reduced during an assisting period, which results in a small operating sound and prevents the belt from skipping a tooth. In addition, the maximum compression amount of the cylindrical portions 290a and 300a of the third elastic element 290 and the fourth elastic element 300 is regulated, which improves the durability of the third elastic element 290 and the fourth elastic element 300. Hence, the durability of the electric power steering device 1 can be improved. Moreover, there is no need to fit an O-ring into an accommodation groove before assembly of the ball bearing 62, which improves the ease of assembly.

The present invention is not limited to the fifth embodiment described above. In the embodiment described above, the gap S5 is brought to zero during an assisting period. However, the present invention is not limited thereto, and the elasticity of the third elastic element 290 and the fourth elastic element 300 and the gap S5 may be set such that the gap S5 is brought to zero when the tension of the belt 53 becomes a predetermined value or more during an assisting period. Besides the modification described above, the present invention may be modified in various ways without departing from the scope of the present invention.

In the electric power steering device according to the fifth embodiment, when the belt exerts its tension to generate an urging force that urges the driven pulley toward the driving pulley during an assisting period, the cylindrical portions of the pair of elastic elements may be elastically compressed by the urging force so that the size of the gap between the predetermined portion of the inner periphery of the radial stopper and the predetermined portion of the outer periphery of the outer ring is brought to zero.

In the electric power steering device according to the above, the predetermined size of the gap during the non-assisting period may be set within a range of 20 μm to 70 μm.

According to the electric power steering device of the fifth embodiment, an urging force that is generated by the tension of the belt when assisting is not performed to urge the driven pulley toward the driving pulley and an elastic repulsion force of the elastic elements are balanced against each other so that a gap with a predetermined size is secured between the predetermined portion of the outer periphery of the outer ring of the bearing and the predetermined portion of the inner periphery of the radial stopper. Thus, when assisting starts, the annular flange portion of a corresponding one of the elastic elements is elastically deformed before the steered shaft which is going to move in the axial direction becomes free from the friction of the ball screw device. Such elastic deformation allows the steered shaft to start moving smoothly in the axial direction together with the bearing and the ball screw nut. Thus, a good steering feeling is offered when assisting starts.

The predetermined portion of the outer periphery of the outer ring of the bearing may include a portion of the outer periphery of the outer ring that is closest to the driving pulley. The predetermined portion of the inner periphery of the radial stopper may include a portion of the inner periphery of the radial stopper that is closest to the driving pulley. When the tension of the belt is increased during the assisting period, the cylindrical portions of the elastic elements may be compressed so that the gap between the predetermined portion of the outer periphery of the outer ring of the bearing and the predetermined portion of the inner periphery of the radial stopper is brought to zero, and so that the predetermined portion of the outer periphery of the outer ring of the bearing is received by the radial stopper. Thus, the center distance between both the pulleys is not excessively reduced, which results in a small operating sound and prevents the belt from skipping a tooth. In addition, the maximum compression amount of the cylindrical portions of the elastic elements is regulated, which improves the durability. Moreover, there is no need to fit an O-ring into an accommodation groove before assembly of the bearing, which improves the ease of assembly.

According to the electric power steering device of the fifth embodiment, during the assisting period, the gap between the predetermined portion of the outer periphery of the outer ring of the bearing and the predetermined portion of the inner periphery of the radial stopper may be brought to zero, and the predetermined portion of the outer periphery of the outer ring of the bearing may be received by the predetermined portion of the inner periphery of the radial stopper. Thus, the center distance between both the pulleys is not excessively reduced during the assisting period, which results in a small operating sound and prevents the belt from skipping a tooth. In addition, the maximum compression amount of the cylindrical portions of the elastic elements is regulated, which improves the durability of the elastic elements. Hence, the durability of the electric power steering device can be improved.

According to the electric power steering device of the fifth embodiment, a gap of 20 μm or more may be secured between the predetermined portion of the outer periphery of the outer ring of the bearing and the predetermined portion of the inner periphery of the radial stopper during the non-assisting period. This allows the bearing to move smoothly when assisting starts. In addition, the center distance between both the pulleys is reduced by a length that is equal to or less than 70 μm, which corresponds to the size of the gap, during the assisting period, which results in a small operating sound and prevents the belt from skipping a tooth.

While the invention has been described with reference to example embodiments thereof, it is to be understood that the invention is not limited to the example described in embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An electric power steering device comprising:
    a metallic housing;
    a steered shaft that is provided in the housing so as to be capable of reciprocating motion;
    an electric motor that is attached to the housing;
    a ball screw device that converts rotation of the electric motor into rectilinear motion of the steered shaft;
    a rolling bearing that rotatably supports the ball screw device on the housing;
    a plain bearing formed from a resin material that is provided between the housing and an outer ring of the rolling bearing;
    a first elastic element and a second elastic element that are provided at both ends of the rolling bearing in an axial direction and are respectively provided between both end surfaces of the outer ring in the axial direction and the housing; and
    at least two projecting portions provided on the plain bearing that project towards the outer ring, the projecting portions including a right projecting portion and a left projecting portion, wherein the right projecting portion is provided at a position of a maximum compression amount of the first elastic element that is away from a right end surface of the plain bearing and the left projecting portion is provided at a position of a maximum compression amount of the second elastic element that is away from a left end surface of the plain bearing.

2. The electric power steering device according to claim 1, wherein a length of the plain bearing in the axial direction is greater than a length of the rolling bearing.

3. The electric power steering device according to claim 2, wherein
    the length of the plain bearing in the axial direction is greater than a length that is obtained by adding the maximum compression amount of the first elastic element and the maximum compression amount of the second elastic element to the length of the rolling bearing in the axial direction.

4. The electric power steering device according to claim 1, wherein the plain bearing is formed from a polyacetal, a nylon, a polyamide, or a polytetrafluoroethylene.

5. The electric power steering device according to claim 1, wherein:
the ball screw device includes a first portion that includes one end portion of the ball screw device in the axial direction of the rolling bearing, a second portion that includes the other end portion of the ball screw device in the axial direction of the rolling bearing, and a belt or a chain that transmits rotation of the electric motor to the ball screw device;
the belt or the chain is wound around the first portion in the axial direction of the rolling bearing; and
the rolling bearing supports the second portion in the axial direction of the rolling bearing.

6. An electric power steering device comprising:
a metallic housing;
a steered shaft that is provided in the housing so as to be capable of reciprocating motion;
an electric motor that is attached to the housing;
a ball screw device that converts rotation of the electric motor into rectilinear motion of the steered shaft;
a rolling bearing that rotatably supports the ball screw device on the housing;
elastic elements that are provided at both ends of the rolling bearing in an axial direction;
a plain bearing formed from a resin material that is provided between the housing and an outer ring of the rolling bearing,
a projecting portion that projects toward the outer ring provided on the plain bearing; and
a gap between the outer ring and the plain bearing that is filled with a lubricant.

7. The electric power steering device according to claim 6, wherein a length of the plain bearing in the axial direction is greater than a length of the rolling bearing.

8. The electric power steering device according to claim 7, wherein:
the elastic elements are a first elastic element and a second elastic element that are respectively provided between both end surfaces of the outer ring in the axial direction and the housing; and
the length of the plain bearing in the axial direction is greater than a length that is obtained by adding a maximum compression amount of the first elastic element and a maximum compression amount of the second elastic element to the length of the rolling bearing in the axial direction.

9. The electric power steering device according to claim 6, wherein:
the ball screw device includes a first portion that includes one end portion of the ball screw device in the axial direction of the rolling bearing, a second portion that includes the other end portion of the ball screw device in the axial direction of the rolling bearing, and a belt or a chain that transmits rotation of the electric motor to the ball screw device;
the belt or the chain is wound around the first portion in the axial direction of the rolling bearing; and
the rolling bearing supports the second portion in the axial direction of the rolling bearing.

10. An electric power steering device comprising:
a metallic housing;
a steered shaft that is provided in the housing so as to be capable of reciprocating motion;
an electric motor that is attached to the housing;
a ball screw device that converts rotation of the electric motor into rectilinear motion of the steered shaft:
a rolling bearing that rotatably supports the ball screw device on the housing;
elastic elements that are provided at both ends of the rolling bearing in an axial direction;
a plain bearing formed from a resin material that is provided between the housing and an outer ring of the rolling bearing; and
a flange included on the plain bearing that projects toward the housing in a radial direction of the steered shaft and fitted in a recessed portion of the housing.

11. The electric power steering device according to claim 10, wherein a length of the plain bearing in the axial direction is greater than a length of the rolling bearing.

12. The electric power steering device according to claim 11, wherein:
the elastic elements are a first elastic element and a second elastic element that are respectively provided between both end surfaces of the outer ring in the axial direction and the housing; and
the length of the plain bearing in the axial direction is greater than a length that is obtained by adding a maximum compression amount of the first elastic element and a maximum compression amount of the second elastic element to the length of the rolling bearing in the axial direction.

13. The electric power steering device according to claim 10, wherein:
the ball screw device includes a first portion that includes one end portion of the ball screw device in the axial direction of the rolling bearing, a second portion that includes the other end portion of the ball screw device in the axial direction of the rolling bearing, and a belt or a chain that transmits rotation of the electric motor to the ball screw device;
the belt or the chain is wound around the first portion in the axial direction of the rolling bearing; and
the rolling bearing supports the second portion in the axial direction of the rolling bearing.

14. An electric power steering device comprising:
a metallic housing;
a steered shaft that is provided in the housing so as to be capable of reciprocating motion:
an electric motor that is attached to the housing;
a ball screw device that converts rotation of the electric motor into rectilinear motion of the steered shaft;
a rolling bearing that rotatably supports the ball screw device on the housing;
elastic elements that are provided at both ends of the rolling bearing in an axial direction;
a plain bearing formed from a resin material that is provided between the housing and an outer ring of the rolling bearing; and
a cut portion provided on a circumferential surface of the plain bearing such that the plain bearing is discontinuous in the circumferential direction.

15. The electric power steering device according to claim 11, wherein a length of the plain bearing in the axial direction is greater than a length of the rolling bearing.

16. The electric power steering device according to claim 15, wherein:

the elastic elements are a first elastic element and a second elastic element that are respectively provided between both end surfaces of the outer ring in the axial direction and the housing; and the length of the plain bearing in the axial direction is greater than a length that is obtained by adding a maximum compression amount of the first elastic element and a maximum compression amount of the second elastic element to the length of the rolling bearing in the axial direction.

17. The electric power steering device according to claim 14, wherein the cut portion extends entirely across the circumferential surface of the plain bearing from a right end to a left end.

18. The electric power steering device according to claim 14, wherein:

the ball screw device includes a first portion that includes one end portion of the ball screw device in the axial direction of the rolling bearing, a second portion that includes the other end portion of the ball screw device in the axial direction of the rolling bearing, and a belt or a chain that transmits rotation of the electric motor to the ball screw device;

the belt or the chain is wound around the first portion in the axial direction of the rolling bearing; and the rolling bearing supports the second portion in the axial direction of the rolling bearing.

19. An electric power steering device comprising:

an electric motor that generates a steering assist force;

a speed reduction mechanism that decelerates rotation of the electric motor;

a steered shaft;

a ball screw device that converts rotation output from the speed reduction mechanism into movement of the steered shaft in an axial direction; and a housing that accommodates the ball screw device, wherein the speed reduction mechanism includes:

a driving pulley that is driven by the electric motor;

a driven pulley that is disposed to surround the steered shaft; and a belt that couples the driving pulley and the driven pulley to each other, and wherein the ball screw device includes:

a threaded portion that is formed on a part of the steered shaft;

a ball screw nut which is threadably engaged with the threaded portion via balls and to which the driven pulley is coupled so as to be rotatable together with the ball screw nut;

a bearing that is retained by a bearing retaining portion of the housing to rotatably support the ball screw nut;

a pair of elastic elements that respectively receive a pair of end portions of an outer ring of the bearing to elastically support the outer ring in the axial direction and a radial direction; and an annular radial stopper that is disposed between the pair of elastic elements to be retained on the bearing retaining portion, wherein each of the elastic elements includes:

a cylindrical portion that extends along an outer periphery of the outer ring; and an annular flange portion that extends radially inward from an end portion of the cylindrical portion along a corresponding end surface of the outer ring, and wherein the radial stopper is interposed between the cylindrical portions of the pair of elastic elements, and when the belt exerts its tension to generate an urging force that urges the driven pulley toward the driving pulley during a non-assisting period, the cylindrical portions of the pair of elastic elements are elastically compressed by the urging force so that a gap with a predetermined size is formed between a predetermined portion of an inner periphery of the radial stopper and a predetermined portion of the outer periphery of the outer ring.

20. The electric power steering device according to claim 19, wherein when the belt exerts its tension to generate an urging force that urges the driven pulley toward the driving pulley during an assisting period, the cylindrical portions of the pair of elastic elements are elastically compressed by the urging force so that the size of the gap between the predetermined portion of the inner periphery of the radial stopper and the predetermined portion of the outer periphery of the outer ring is brought to zero.

21. The electric power steering device according to claim 19, wherein the predetermined size of the gap during the non-assisting period is set within a range of 20 μm to 70 μm.

* * * * *